United States Patent
Shibuya et al.

(10) Patent No.: US 8,139,841 B2
(45) Date of Patent: Mar. 20, 2012

(54) VISUAL INSPECTION METHOD AND APPARATUS AND IMAGE ANALYSIS SYSTEM

(75) Inventors: Hisae Shibuya, Chigasaki (JP); Shunji Maeda, Yokohama (JP)

(73) Assignee: Hitachi High-Technologies Corporation, Tokyo (JP)

( * ) Notice: Subject to any disclaimer, the term of this patent is extended or adjusted under 35 U.S.C. 154(b) by 944 days.

(21) Appl. No.: 12/141,947

(22) Filed: Jun. 19, 2008

(65) Prior Publication Data
US 2008/0317329 A1 Dec. 25, 2008

(30) Foreign Application Priority Data
Jun. 20, 2007 (JP) ................................ 2007-162770

(51) Int. Cl.
*G06K 9/00* (2006.01)
(52) U.S. Cl. ..................................................... 382/141
(58) Field of Classification Search .......... 382/141–152, 382/190, 155–160, 224; 348/86, 87, 125, 348/126; 356/237.1–237.5; 702/35; 716/112
See application file for complete search history.

(56) References Cited

U.S. PATENT DOCUMENTS

| | | | | |
|---|---|---|---|---|
| 6,826,735 B2 * | 11/2004 | Ono et al. | ...................... | 716/112 |
| 7,269,280 B2 * | 9/2007 | Hiroi et al. | ..................... | 382/149 |
| 7,689,029 B2 * | 3/2010 | Onishi et al. | .................. | 382/149 |
| 7,714,997 B2 * | 5/2010 | Shibata et al. | ............. | 356/237.2 |
| 7,720,275 B2 * | 5/2010 | Shibuya et al. | ............... | 382/149 |
| 7,903,867 B2 * | 3/2011 | Nakahira et al. | .............. | 382/149 |
| 2006/0078189 A1 * | 4/2006 | Hosoya et al. | ................ | 382/149 |

FOREIGN PATENT DOCUMENTS

| | | |
|---|---|---|
| JP | 2000-105203 | 4/2000 |
| JP | 2004-079593 | 3/2004 |
| JP | 2006-266872 | 10/2006 |

* cited by examiner

*Primary Examiner* — Ishrat I Sherali
(74) *Attorney, Agent, or Firm* — Antonelli, Terry, Stout & Kraus, LLP.

(57) ABSTRACT

An image feature is calculated based on the image of a detected defect, a coordinate feature is calculated based on position coordinates of the detected defect, and false alarm judgment is performed according to a decision tree constructed by threshold processing to the image feature or the coordinate feature.

9 Claims, 18 Drawing Sheets

VISUAL INSPECTION METHOD AND APPARATUS AND IMAGE ANALYSIS SYSTEM

CLAIM OF PRIORITY

The present application claims priority from Japanese Patent Application JP 2007-162770 filed on Jun. 20, 2007, the content of which is hereby incorporated by reference into this application.

BACKGROUND OF THE INVENTION

The present invention relates to a visual inspection method and apparatus which perform detection and classification of defect, such as a fine pattern defect and a foreign particle, based on an image of an object obtained using a light of a lamp, a light of a laser, or an electron beam, for thin film devices such as a semiconductor wafer, TFT, and a photomask. The present invention relates especially to a visual inspection method and apparatus which are suitable to conduct the visual inspection of a semiconductor wafer.

Thin film devices, such as a semiconductor wafer, a liquid crystal display, and a magnetic head for a hard disk drive, are manufactured through many fabrication steps. In manufacture of such thin film devices, a visual inspection is performed for every series of several fabrication steps for the purpose of the improvement and stabilization in the yield. In the visual inspection, a pattern defect or a foreign particle-caused defect is detected, based on a reference image and an inspection image which are obtained by illuminating corresponding regions in two patterns originally formed to be of identical shape, by a light of a lamp, a light of a laser, or an electron beam. That is, after making registration of the reference image and the inspection image, a difference is calculated and compared with a threshold defined separately. Subsequently, a region where the difference is larger than the threshold is detected as a defect or a foreign particle. As one of threshold calculating methods, JP-A-2000-105203 discloses a method of calculating a threshold as a fixed multiple of a standard deviation indicative of the degree of the variation, corresponding to the variation in the detection signal of a region which is originally formed to be of identical shape, or its neighborhood.

In such an inspection, in order to detect a minute defect, it is necessary to make judgment by setting the threshold low. However, the threshold which is set too low will bring about many false alarms due to the minute difference of a pattern arising from a sampling error, roughness, or grains, or due to uneven brightness caused by film thickness unevenness. From the view point of the purpose of the inspection, a false alarm is completely unnecessary. Therefore, the threshold is often set high to such an extent that the ratio of a false alarm becomes small enough in the entire wafer, thereby performing the inspection at the sacrifice of sensitivity in many cases. For improving sensitivity, JP-A-2004-79593 discloses a method in which an entire wafer or a die is divided into regions, and a defect judgment is performed using different thresholds for every region. According to this technique, it is possible to suppress generation of false alarms, without reducing sensitivity in the entire wafer.

JP-A-2006-266872 discloses a visual inspection method and apparatus which are operable to detect a defect based on an inspection image by a compare check, operable to calculate feature of the defect at the same time, and perform defect classification according to the classification condition set up previously to classification condition setting means. The classification condition setting means collects the feature of the defects covering a large number of defects previously obtained by defect detecting means, samples a defect based on a defect feature distribution, and sets up a defect classification condition based on it.

SUMMARY OF THE INVENTION

According to JP-A-2004-79593, it is necessary to perform a preliminary inspection, to classify the result into a real defect and a false alarm by reviewing, and to divide the region in accordance with the density of the false alarm. Accordingly, there is a problem of requiring a long time in reviewing. Although it is also possible to perform the defect judgment using a threshold which is different for every region obtained after division without reviewing, in that case, there is a problem that a suitable region setting is difficult since it is necessary to decide the region, without a proper guideline.

One embodiment of the present invention provides a method of inspection with a high sensitivity and a suppressed occurrence of a false alarm, without a region setting, by performing a false alarm judgment based on the image feature and coordinate feature of a detected defect.

Another embodiment of the present invention provides a simple method of setting up a suitable false alarm judgment criterion based on a teaching of whether the detected defect is a false alarm or a real defect.

A visual inspection method and apparatus according to one embodiment of the present invention are operable to calculate an image feature based on the image of a detected defect, calculate a coordinate feature based on the position coordinates of the detected defect, and perform a false alarm judgment according to a decision tree which is defined by threshold processing to the image feature or the coordinate feature.

Furthermore, the visual inspection method and apparatus according to one embodiment of the present invention are operable to perform a preliminary inspection, operable to perform teaching of a real defect or a false alarm about the detected defect, calculate an image feature based on the image of the detected defect, calculate a coordinate feature based on the position coordinates of the detected defect, calculate the histogram of a false alarm and a real defect for every feature, choose automatically one of the image feature and the coordinate feature based on the histogram, and decide a threshold; consequently it is possible to set up a false alarm judgment criterion.

The visual inspection method and apparatus according to one embodiment of the present invention are operable to calculate the image feature based on the image of a detected defect, calculate the coordinate feature based on the position coordinates of the detected defect, choose one from the image feature and the coordinate feature by a user, display an image of the detected defect in the ascending order or descending order of the feature selected, set a boundary so that a false alarm does not exist in one side, repeat the processing after the selection of the feature recursively for the other defects, and set up a false alarm judgment criterion.

These and other objects, features and advantages of the invention will be apparent from the following more particular description of preferred embodiments of the invention, as illustrated in the accompanying drawings.

DESCRIPTION OF THE PREFERRED EMBODIMENTS

The contents of the present invention are now explained with reference to the accompanying drawings in the following.

Embodiment 1

Figure 1:
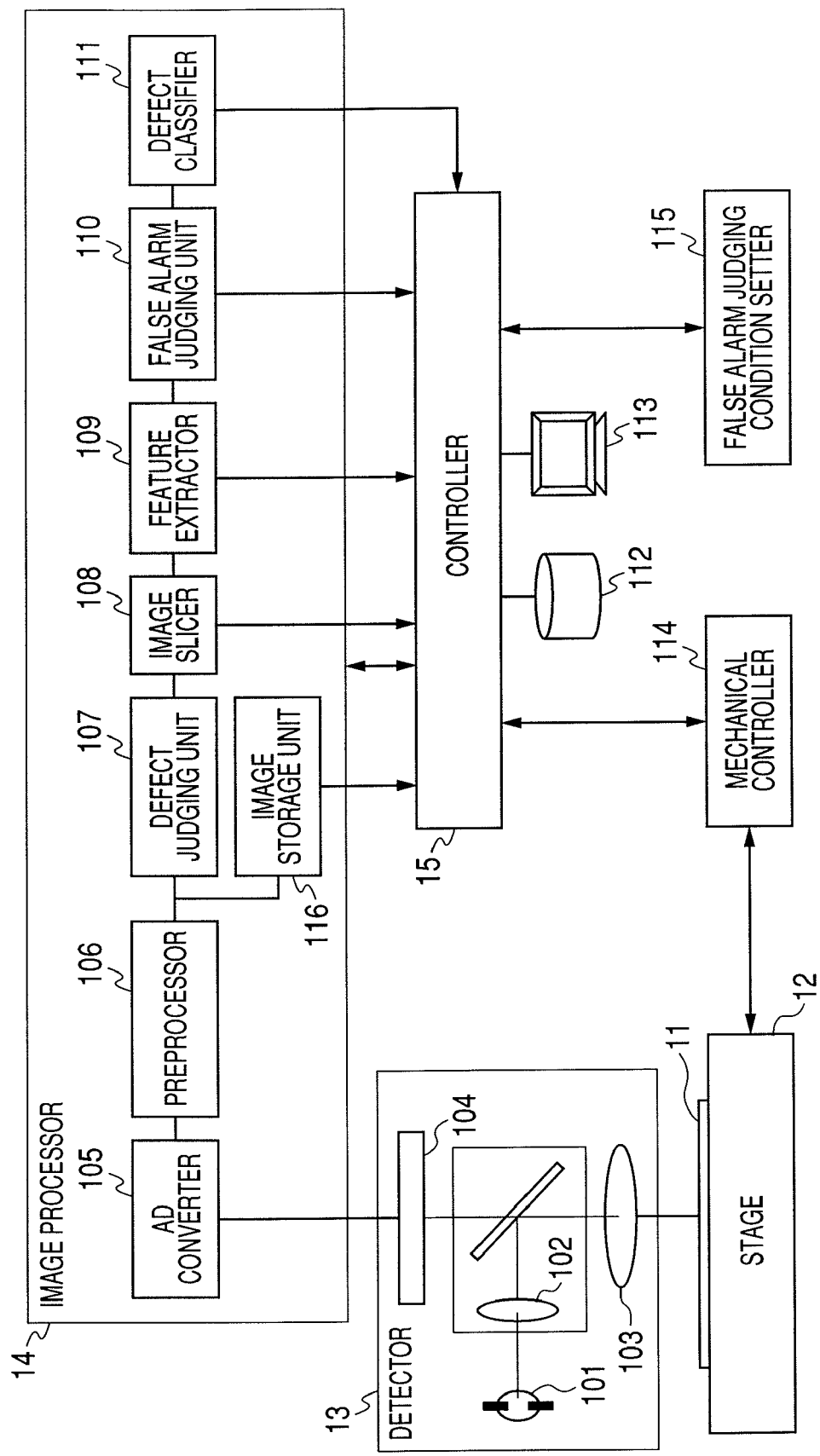
FIG. 1 is a diagram illustrating outline structure of a visual inspection apparatus according to one embodiment of the present invention.

A first embodiment of the present invention is described in detail with reference to FIGS. 1 to 16. The present embodiment takes for an example an optical visual inspection apparatus for a semiconductor wafer. FIG. 1 illustrates an exemplified structure of the optical visual inspection apparatus. The optical visual inspection apparatus according to the present embodiment includes a stage 12 which mounts and moves an inspecting object 11 such as a semiconductor wafer, a detector 13, a light source 101 for illuminating the inspecting object 11, an illumination optical system 102 which condenses the light emitted from the light source 101, an objective lens 103 which illuminates the inspecting object 11 by the illumination light condensed by the illumination optical system 102 and provides an image by forming the reflected optical image, an image sensor 104 which converts into a image signal the formed optical image corresponding to the brightness thereof. An image processor 14 detects a defect candidate on the sample wafer with the image detected by the detector 13. Herein, the light source 101 is a lamp light source or a laser source, for example. The image sensor 104 is a CCD linear sensor, a TDI sensor, or a Photomultiplier, for example.

The image processor 14 includes an AD converter 105 which converts an input signal from the image sensor 104 of the detector 13 into a digital signal, a pre-processor 106 which performs image corrections, such as a shading correction and a dark level correction, to the AD-converted digital signal, a defect judging unit 107 which compares a reference image with a detection image which are detected from the corresponding positions of adjoining dies, and outputs as a defect a portion which has a larger difference value than a threshold set up separately, an image slicer 108 which clips a detection image and a reference image in the size previously defined centering on the position of a detected defect, a feature extractor 109 which calculates an image feature from the clipped image and a coordinate feature from the defect coordinates, a false alarm judging unit 110 which judges a false alarm based on the calculated feature, and a defect classifier 111 which classifies the real defect obtained by removing the false alarm. An image storage unit 116 saves a stream picture to be used for defect judgment at a specified time.

An overall controller 15 includes a storage device 112 which stores the coordinates, feature, and image of the detected defect, a user interface unit 113 which accepts change of the inspection parameter from a user, and displays information on the detected defect, and a CPU which performs various control. A mechanical controller 114 drives the stage 12 according to a control command from the overall controller 15. Although not shown, the image processor 14 and the detector 13 are also driven by a command from the overall controller 15. A false alarm judging condition setter 115 sets up a decision tree which is configured by threshold processing with respect to either the image feature or the coordinate feature.

Figure 2:
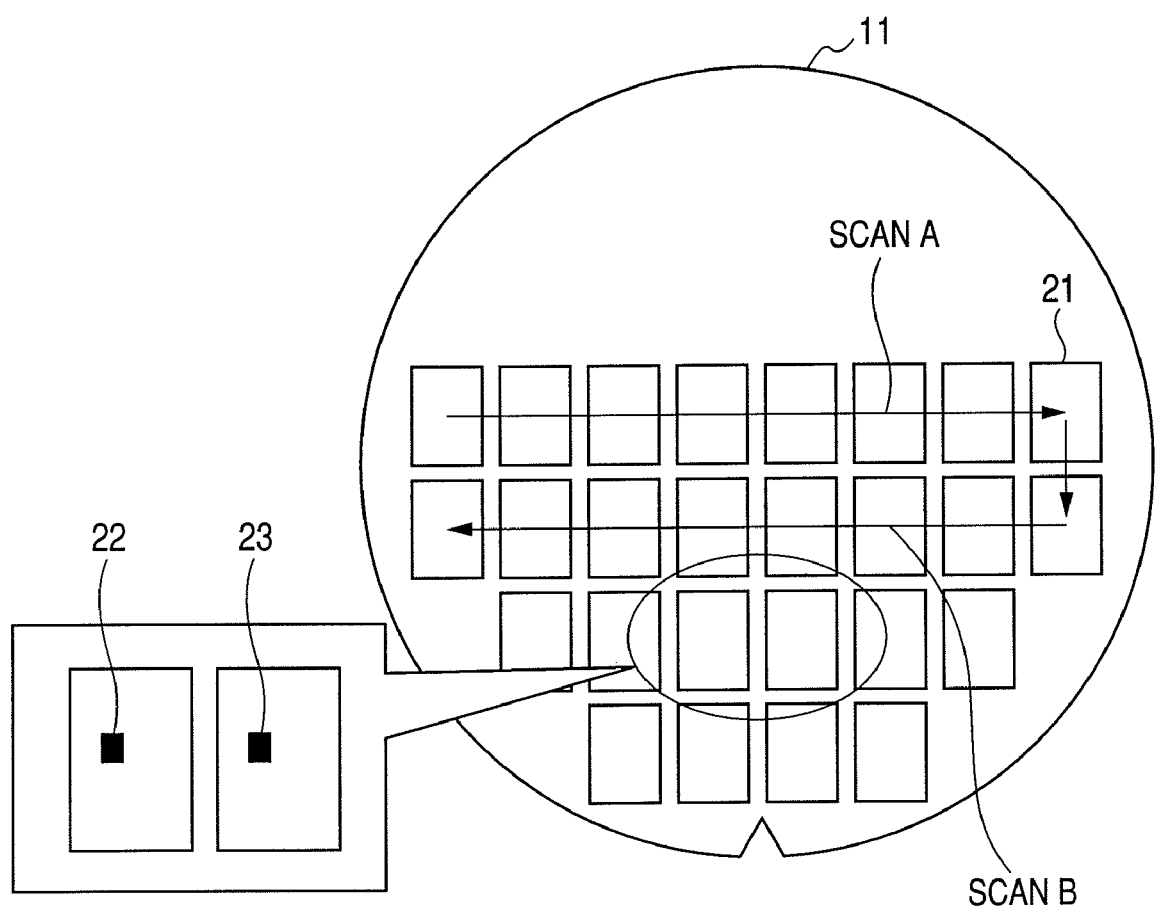
FIG. 2 is a plan view illustrating a semiconductor wafer as an inspection object.

Next, a defect detection method according to the visual inspection apparatus illustrated in FIG. 1 is explained. The semiconductor wafer 11, which is an object to be inspected, possesses many regularly-arranged dies 21 of the pattern which is designed to be the same as illustrated in FIG. 2. Images are compared between the corresponding positions of the adjoining two dies, for example, a region 22 and a region 23 of the adjoining chips of FIG. 2, and a portion which has a difference between both images is detected as a defect.

The operation is explained in the following. The overall controller 15 moves continuously the stage 12, on which the semiconductor wafer 11 as an inspecting object is mounted, in the direction opposite to the direction of Scan A illustrated in FIG. 2, for example. Synchronizing with the continuous movement of the stage 12, the optical image of the semiconductor wafer 11 is detected one by one in the direction of Scan A with the image sensor 104 of the detector 13, and the image of a chip is taken in from the detector 13. The image sensor 104 of the detector 13 outputs the inputted signal to the image processor 14.

In the image processor 14, at first, the AD converter 105 converts the analog signal inputted into a digital signal, and the pre-processor 106 performs a shading correction, a dark level correction, etc. The defect judging unit 107 makes defect judgment by the method described later. The image slicer 108 clips a detection image and a reference image in the prescribed size centering on the position of the detected defect. The feature extractor 109 calculates the image feature based on the detection image and reference image which have been clipped, and the coordinate feature based on the position information on the defect. Based on the feature, the false alarm judging unit 110 makes false alarm judgment according to the criterion which is set up previously in the false alarm judging condition setter 115. Then, the false alarm judging unit 110 outputs real defect information.

The defect classifier 111 classifies the detected defect according to the classifying conditions set up previously, and outputs the class information of each defect. Any of publicly known identifying methods may be used as the classifying method. The storage device 112 stores the position information on the defect outputted from the defect judging unit 107, the image information outputted from the image slicer 108, the feature of the defect outputted from the feature extractor 109, the real defect information outputted from the false alarm judging unit 110, and the defect class information outputted from the defect classifier 111. These pieces of information are displayed to a user via the user interface unit 113.

Figure 3:
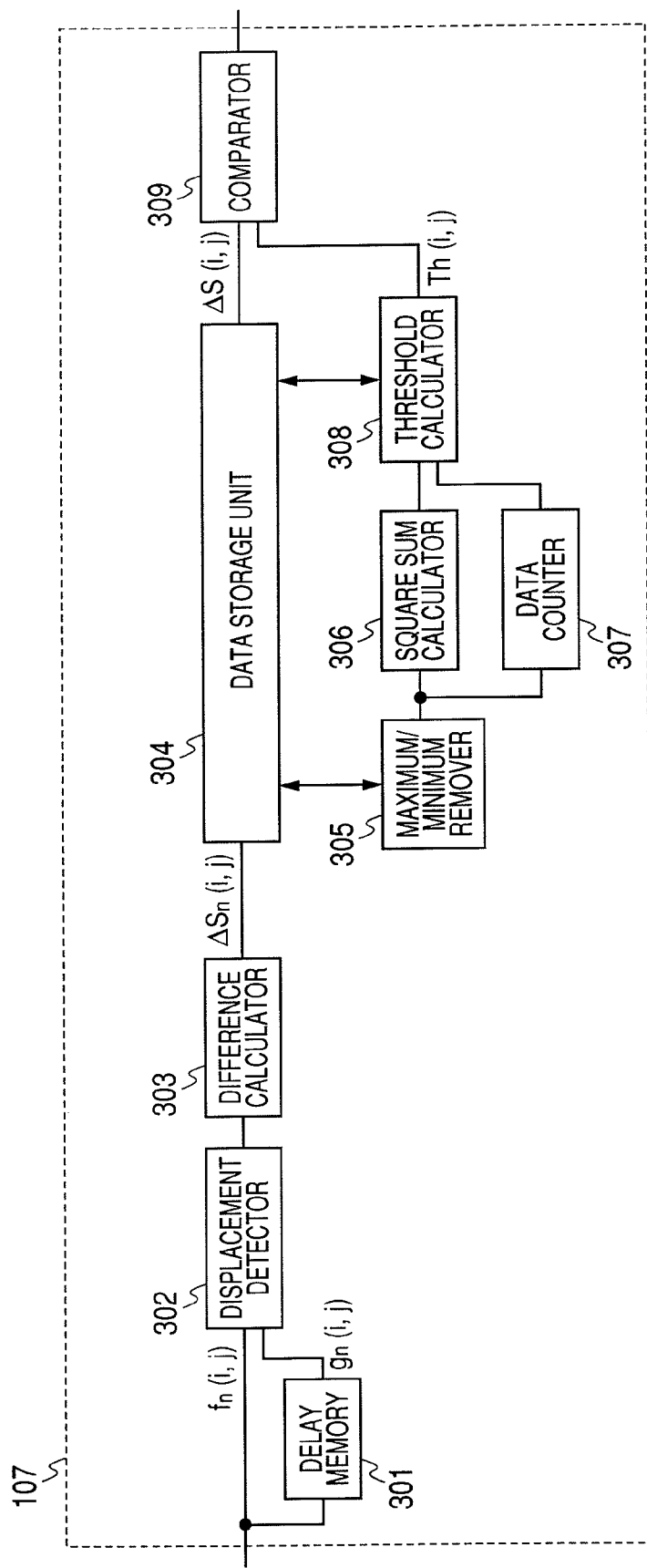
FIG. 3 is an explanatory diagram illustrating an example of a method of defect judgment.

The details of the defect judging unit 107 are illustrated in FIG. 3. A set of an image signal of the die to be inspected, or a detected image signal $f_n(i, j)$, and an image signal of a die previously adjacent to the die to be inspected, or a reference image signal $g_n(i, j)$, are outputted from the pre-processor 106 and inputted to the defect judging unit 107. Here, "n" stands for a die number, and "(i, j)" for the coordinates in a die. The reference image signal $g_n(i, j)$ is obtained from a delay memory 301 after a time delay for which the stage moves across one die.

A displacement detector 302 calculates the amount of displacement between two images which are inputted continuously. The displacement may arise from vibration etc. of the stage. Although the detected image signal $f_n(i, j)$ and the reference image signal $g_n(i, j)$ are continuously inputted at this time, the calculation of the amount of displacement is performed sequentially for every unit of processing which is set to a specific length. A difference calculator 303 calculates a difference image $\Delta S_n(i, j)$, after making registration of the detection image and the reference image using the calculated amount of displacement. The difference image $\Delta S_n(i, j)$ is once stored in a data storage unit 304.

Next, a threshold is calculated for every pixel using the difference image covering plural dies. The difference image $\Delta S_n(i, j)$ covering the plural dies is inputted into a maximum/minimum remover 305. The maximum/minimum remover 305 calculates and removes the maximum and the minimum from the plural input data. From the input data, a square sum calculator 306 calculates the sum of the square value of the difference signal ($\Sigma \Delta S_n^2$), and a data counter 307 calculates the number of input data n. A threshold calculator 308 calculates a standard deviation $\sigma(i,j)=\sqrt{\Sigma \Delta S_n(i,j)^2/n}$, using the sum of squares $\Sigma \Delta S_n^2$ and the number of input data n, and calculates a threshold Th (i, j) with the following equation using threshold parameters s, k, and o.

$$Th(i, j) = \begin{cases} s & \text{if } s > k\sigma(i, j) + o \\ k\sigma(i, j) + o & \text{else} \end{cases} \quad \text{[Equation 1]}$$

Here, s is the minimum threshold, k is a coefficient to multiply $\sigma$, and o is an offset. When calculating $\sigma$, the maximum and the minimum are excluded in order to prevent the calculated result from deviating too much under the influence of a defect, if exists. Since the probability that plural defects exist in the same pixel of different dies is very low, it is not necessary to exclude any more. The threshold corresponding to $\sigma$, i.e., the variation in brightness, is set up for every corresponding position between dies by the above processing. By setting the threshold in this way, it becomes unnecessary to set up a threshold in accordance with the region of large variation, and the defect detection in the region of small variation can be performed with a high sensitivity.

A comparator 309 inputs the difference images $\Delta S_{n-1}(i, j)$ and $\Delta S_n(i, j)$ one by one from the data storage unit 304 to compare with the threshold Th (i, j), and outputs, as a defect candidate, a region where the absolute value of difference is large for both difference images. This is because it is difficult to judge which of $f_n(i, j)$ or $g_n(i, j)$ shall have a defect when only $\Delta S_n(i, j)$ is compared. After the defect judgment, the position of the defect candidate detected is converted into wafer coordinates and die coordinates and stored. One which has a smaller absolute value between the difference values $\Delta S_{n-1}(i, j)$ and $\Delta S_n(i, j)$, the standard deviation $\sigma$, and the threshold Th are also stored. ID of the die in which the defect candidate is included is also stored.

The difference calculator 303 may calculate the absolute difference value $|\Delta S_n(i, j)|$. In that case, in order to exclude the influence of a defect, if exists, the maximum/minimum remover 305 preferably removes the second highest value instead of the minimum value.

The threshold parameters s, k, and o described above are included in an inspection recipe. The inspection recipe is prepared for every product class and process, and includes at least a product class name, a process name, wafer size, an inspection direction, die size, die matrix information, the above-mentioned threshold parameters, and an illumination/detection optical condition.

Figure 4:
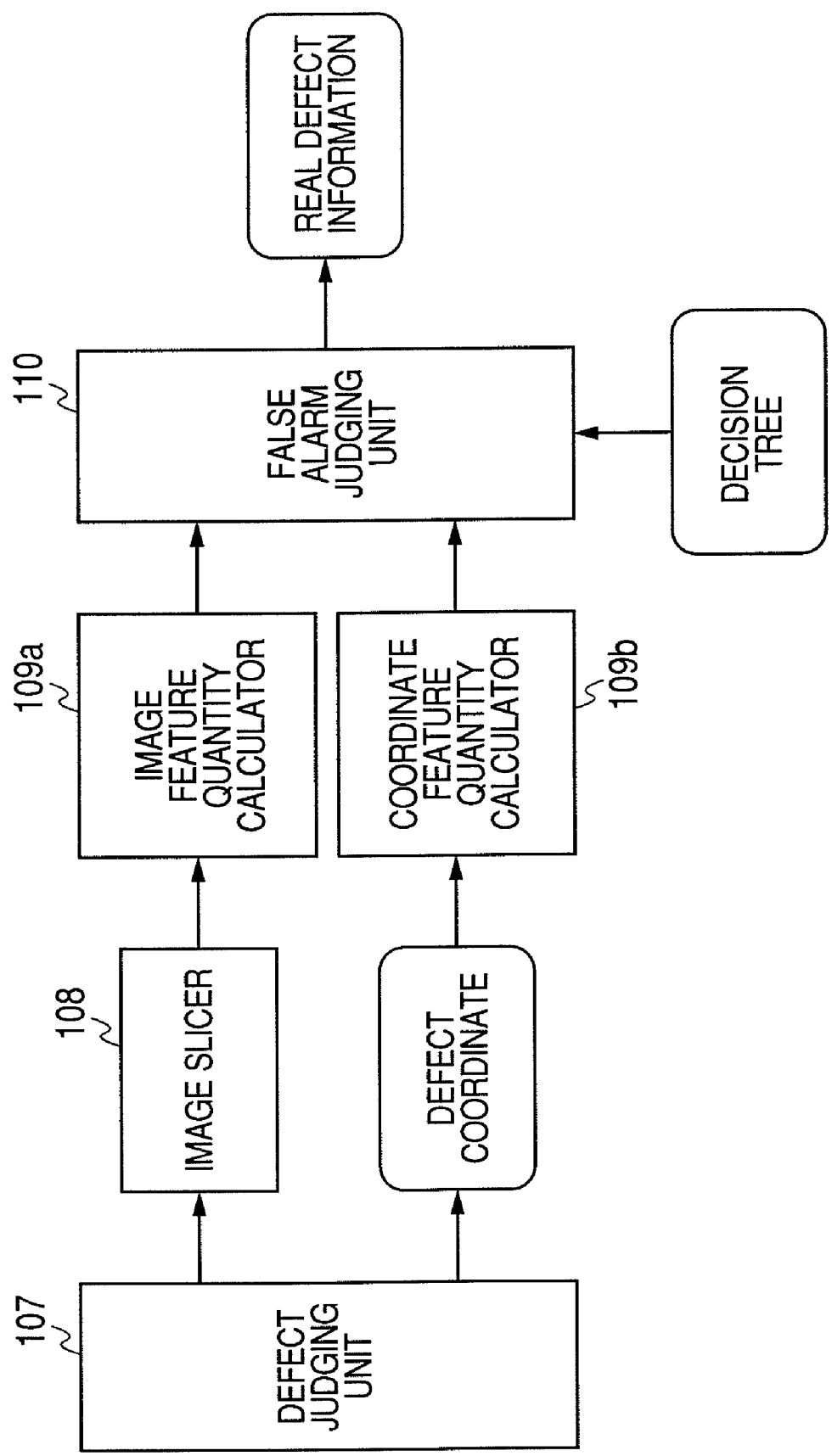
FIG. 4 is a diagram illustrating partial structure of a visual inspection apparatus from defect judgment to false alarm judgment, according to one embodiment of the present invention.

Next, the details of processing from the defect judgment to the false alarm judgment are explained with reference to FIGS. 4 and 5. The image slicer 108 clips the detection image and the reference image in the prescribed size centering on the position of the defect detected by the defect judging unit 107. Based on the detection image and reference image clipped, an image feature extractor 109a calculates an image feature, such as feature indicative of the size of the defect, feature indicative of the brightness of the defect, feature indicative of the shape of the defect, feature indicative of the information on a background, and feature indicative of similarity with the reference image. A coordinate feature extractor 109b calculates a coordinate feature indicative of defect distribution feature inside of the wafer or in the die, based on the position information on the defect detected by the defect judging unit 107.

Figure 5:
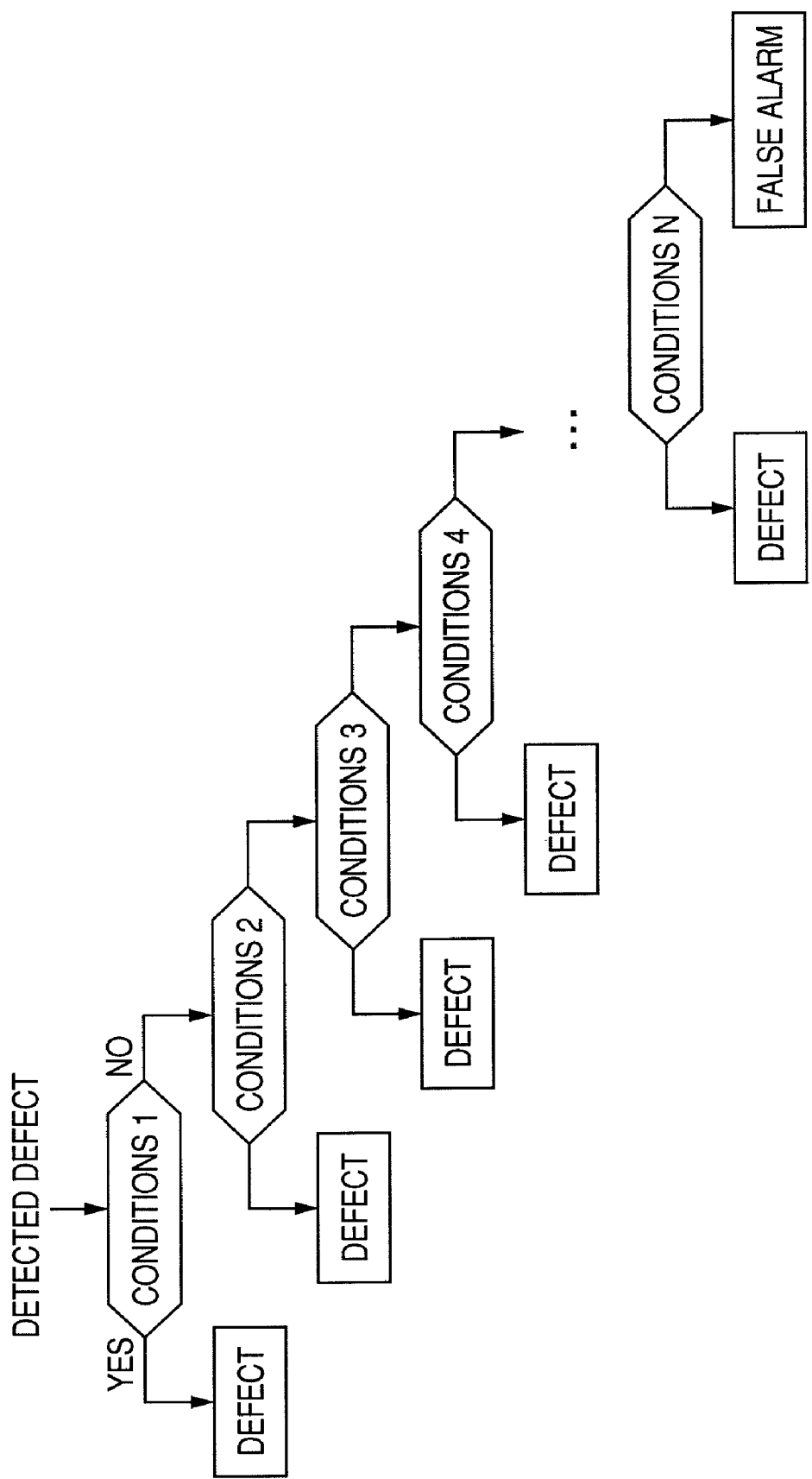
FIG. 5 is an explanatory chart illustrating a decision tree used as a false alarm judgment criterion.

The false alarm judging unit 110 discerns between a false alarm and a real defect according to a decision tree illustrated in FIG. 5. That is, if Condition 1 is fulfilled, then the detected defect is determined as a real defect, otherwise, if Condition 2 is fulfilled, then the detected defect is determined as a real defect, otherwise, if Condition 3 is fulfilled, then the detected defect is determined as a real defect, otherwise, (judgment is continued one by one, and finally) if condition N is fulfilled, then the detected defect is determined as a real defect, otherwise, the detected defect is determined as a false alarm. Each condition is described by the threshold processing with respect to either one of the image feature and the coordinate feature.

Figure 6:
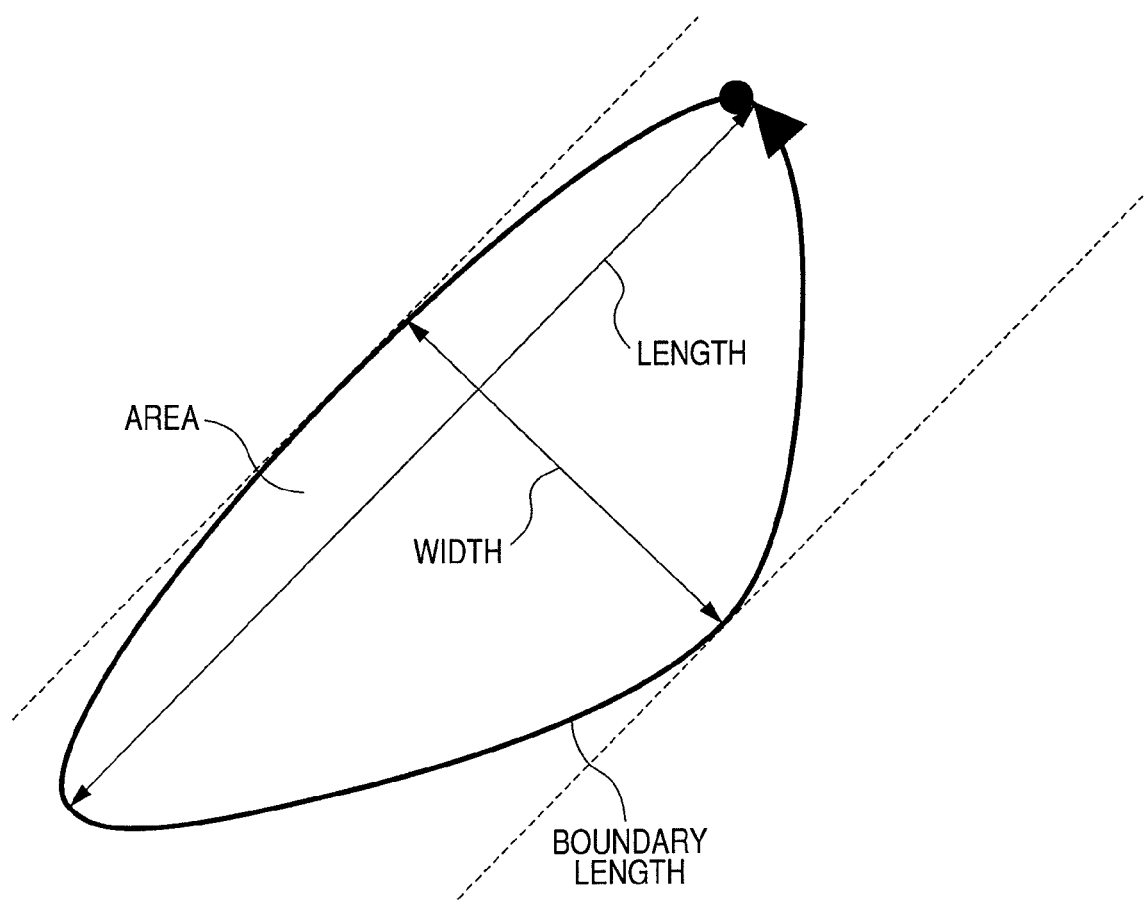
FIG. 6 is a chart explaining an image feature indicating size.

Here, the example of the image feature is described. The feature indicative of the size of a defect includes area, length, width, boundary length, etc., as illustrated in FIG. 6. The region surrounded by the thick line indicates the defect region where the difference exceeds a threshold and each feature has to be measured. The feature indicative of the brightness of a defect includes the highest brightness, the maximum of difference from the reference image, the total brightness of a defect region, etc., for example.

The feature indicative of the shape of a defect includes the ratio of length to width, the first degree of circularity expressed by the ratio of squared length to area, the second degree of circularity expressed by the ratio of area to squared boundary length, etc. The feature indicative of the background of a defect includes the average brightness, distribution, edge density in the x-direction or in the y-direction of the defect region of the reference image, etc., for example. The edge density may be defined as follows. For example, a suitable differential filter is applied in the x-direction or in the y-direction, and a pixel exceeding a threshold is counted as an edge pixel. The number of the edge pixels is divided by the number of pixels in the defect region, to give a value corresponding to the edge density. The feature indicative of similarity to the reference image is given for example by a correlation value which is calculated using the following equation.

$$\sqrt{\frac{C^2}{DE}} \begin{cases} C = N \sum_{i,j} f(i,j)g(i,j) - \left(\sum_{i,j} f(i,j)\right)\left(\sum_{i,j} g(i,j)\right) \\ D = N \sum_{i,j} f(i,j)^2 - \left(\sum_{i,j} f(i,j)\right)^2 \\ E = N \sum_{i,j} g(i,j)^2 - \left(\sum_{i,j} g(i,j)\right)^2 \end{cases}$$ [Equation 2]

Here, N stands for a pixel number, f (i, j) for a detection image, and g (i, j) for a reference image. Since the correlation value cannot be easily influenced by uneven brightness, the correlation value is effective in discernment of the real defect and the false alarm which is generated due to the uneven brightness.

Figure 7:
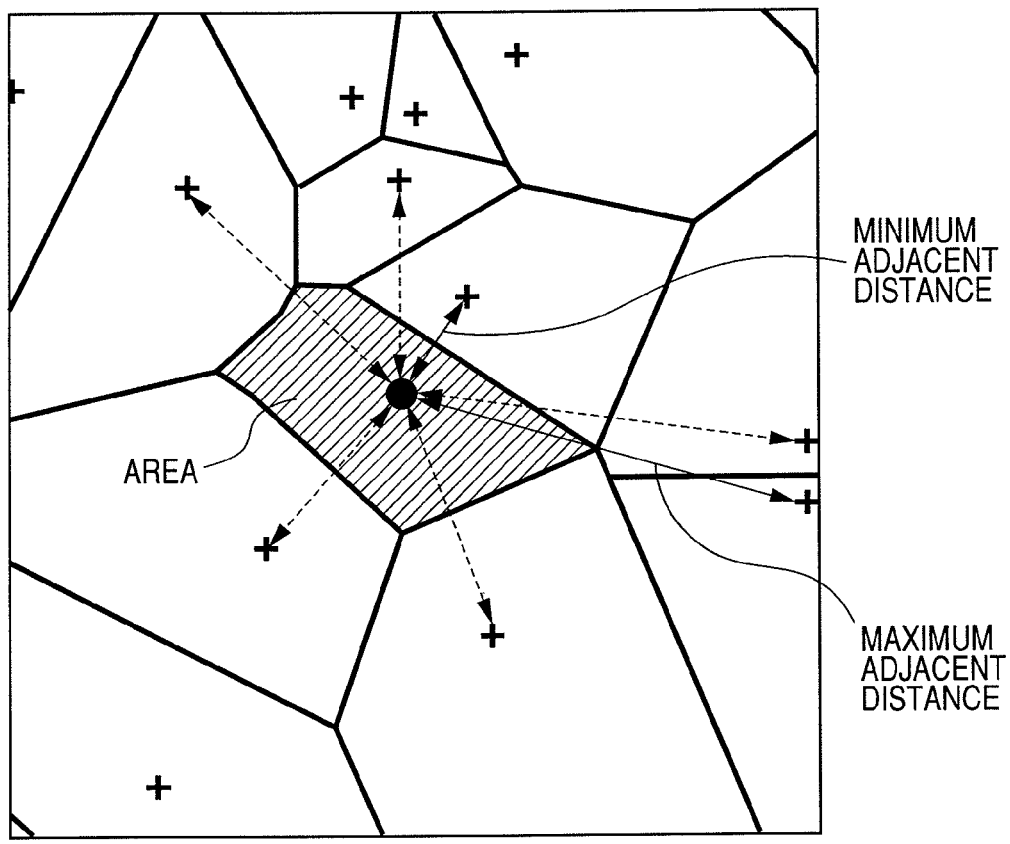
FIG. 7 is a chart explaining a coordinate feature.

Next, the example of the coordinate feature is described. The coordinate feature indicates a spatial distribution characteristic. Although the coordinate feature is calculated individually for each defect like the image feature, the coordinate feature can be effectively obtained if a nearest-point Voronoi diagram is calculated in advance to a group of whole defect points. FIG. 7 illustrates an example describing a nearest-point Voronoi diagram to a group of defect points. The polygon which encloses each point is called the Voronoi region of the corresponding point. Two points of which the Voronoi regions come in contact each other adjoin mutually. The smallest and the greatest distance among adjacent points illustrated in FIG. 7 are one of the coordinate feature of the defect indicated by the black dot. The ratio of the smallest to the greatest distance among adjacent points, and the local density defined by the inverse number of the hatched Voronoi region are also one of the coordinate feature.

Figure 8:
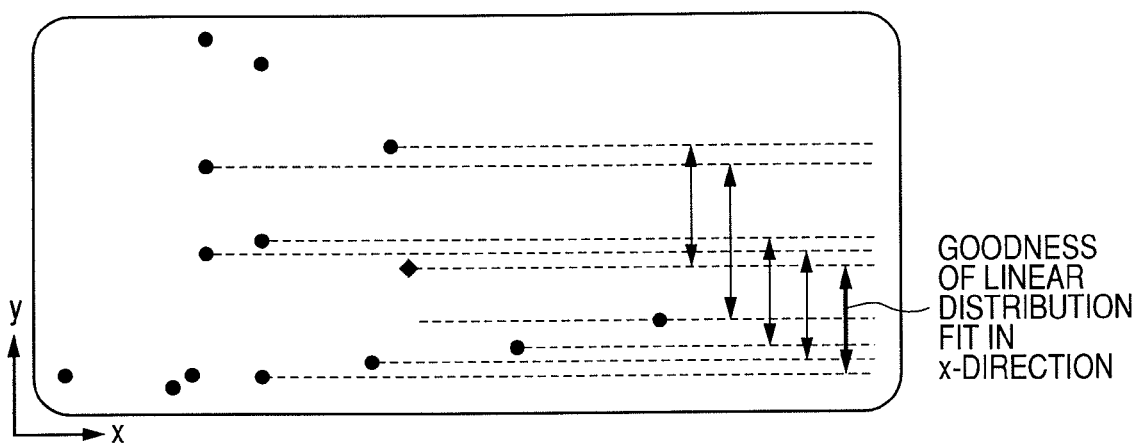
FIG. 8 is an explanatory chart illustrating goodness of linear distribution fit of the coordinate feature.

In addition, there is another feature which is indicative of goodness of fit with the linear distribution in the x-direction or in the y-direction. The calculating method is explained with reference to FIG. 8. FIG. 8 shows a part of a die superposition defect map. When k neighborhood defects including a target defect in the x-direction or in the y-direction gather in a narrow range, it is regarded that the goodness of fit with the linear distribution in the y-direction or in the x-direction is high. Consequently, the minimum value of k kinds of widths among the k neighborhood defects is referred to as one of the feature. The diamond mark in FIG. 8 indicates the target defect. Assuming that k=5, the minimum value of the widths in the y-direction is sought. If the minimum value is small, it is supposed that the target defect is on a straight line in the x-direction.

The minimum value of the widths of k neighborhood defects in the x-direction is calculated similarly, and referred to as one of the feature. If the whole defects are beforehand sorted in order of the x-coordinate or the y-coordinate, a neighborhood defect can be found efficiently. The coordinate feature has layout dependence, therefore, it is effective in discernment of the real defect and the false alarm which is generated with high density or is generated on a straight line along a specific pattern.

In addition, the explanation described above does not limit the definition and applicable range of the feature used by the present invention.

A false alarm judging condition setting method by the false alarm judging condition setter 115 is now explained. A first method for setting false alarm judging conditions is explained with reference to FIGS. 9 to 12. The first method includes a step of teaching a real defect or a false alarm to a defect detected by the defect judging unit 107, and a step of constructing a decision tree automatically based on distribution of the feature calculated by the feature extractor 109. More exact teaching will be attained, when the defect detected by the defect judging unit 107 is reviewed using SEM or an optical review apparatus and the review image is saved in advance of the teaching. However, the review image may not be saved.

Figure 9:
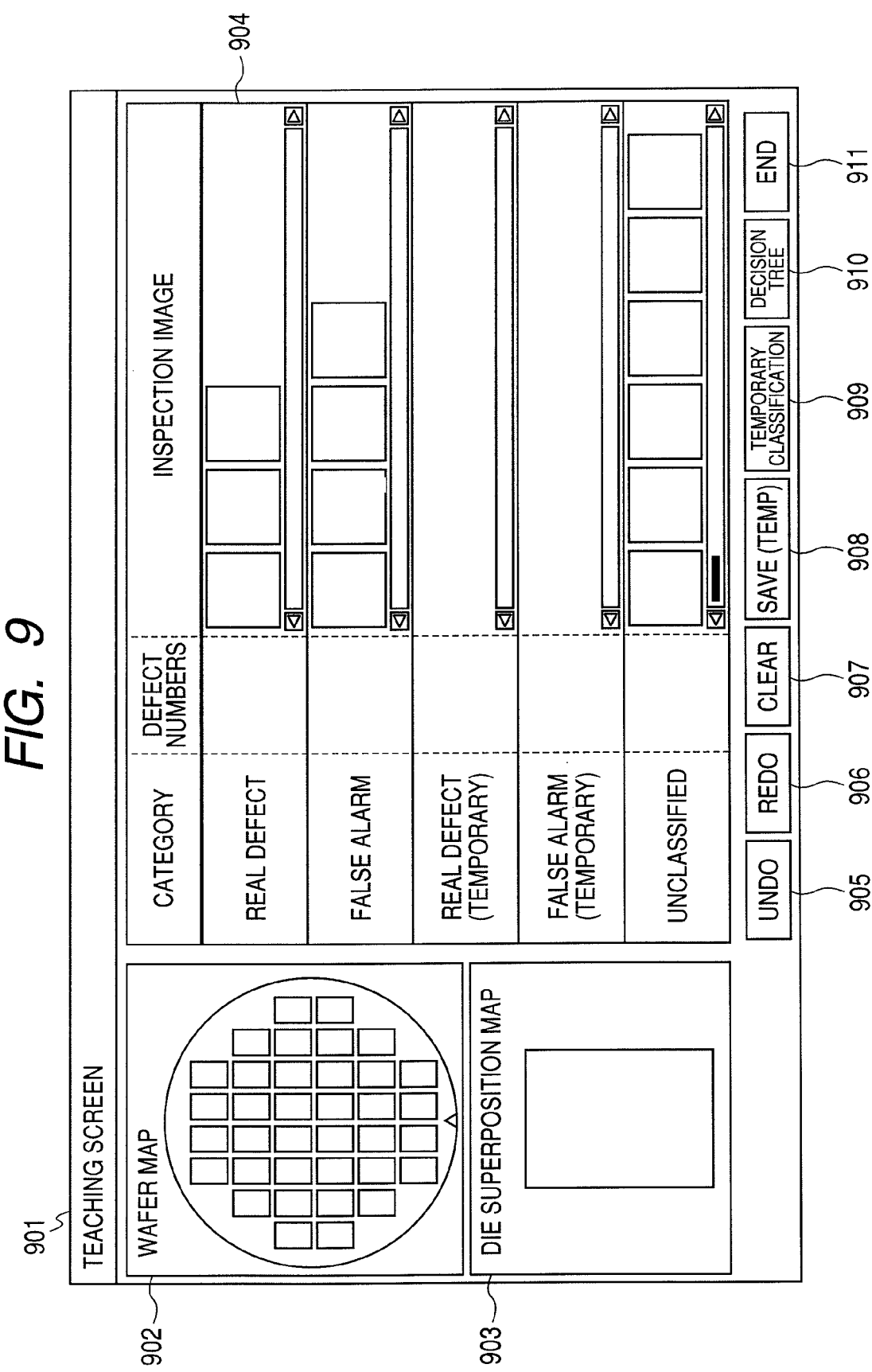
FIG. 9 is an exemplified view illustrating GUI teaching a real defect and a false alarm in a visual inspection apparatus according to one embodiment of the present invention.

FIG. 9 is an exemplified view illustrating a teaching screen which teaches a real defect or a false alarm, according to one embodiment. A teaching screen 901 includes a wafer map viewing window 902, a die superposition map display window 903, and an inspection image list display window 904. The wafer map viewing window 902 and the die superposition map display window 903 display a map indicating the defect position on the wafer coordinates and on the die coordinates, respectively. A real defect, a false alarm, and an unclassified defect are displayed by different colors on the map. A real defect and a false alarm in temporary classification are displayed as different marks.

The inspection image list display window 904 displays an inspection image in order of defect ID for every category. The category possesses five kinds: "real defect", "false alarm", "real defect in temporary classification", "false alarm in temporary classification", and "unclassified." All the defects are displayed on one of columns without duplication. In an initial state, all the defects are displayed on the unclassified column. Each defect can be moved to a real defect or a false alarm by the drag and drop of the corresponding image. The procedure is the operation of the teaching.

One or plural images may be selected at a time. The defect clicked on the wafer map or the die superposition map becomes in a selected state, and the corresponding inspection image is highlighted and displayed on the inspection image list display window 904. It will be preferable if all defects included in the specified area on the wafer map or the die superposition map can be made in a selected state. This is because such a function will enable it to teach at one time the defects which exist densely in a region or align on a straight line on the map.

Operation by a button is explained below. By depressing an Undo button 905, the current state returns to the state before the last operation. By depressing a Redo button 906, the operation canceled by the Undo button 905 is performed once again. By depressing a Clear button 907, the current state returns to the state at which temporary storing is performed. If temporary storing has not been performed, all the defects return to the unclassified state.

By depressing a Temporary Store button 908, information on association of a defect to a category at the time is saved temporarily. If the temporary storing is performed whenever it is confirmed that there is no error about a taught defect, it is possible to return easily to the state where there is no error, even when an improper operation is performed after that.

By depressing a Temporary Classification button 909, the unclassified defect is classified temporarily by a certain method based on taught data, and the image is moved to the category of "real defect of temporary classification", or to the category of "false alarm of temporary classification." Even from the present state, it is also possible to move an image to the category of "real defect" or to the category of "false alarm" by the drag and drop of the image. By clicking on a category name, all the images of the category can be turned into a selected state. The present function allows it to teach collectively a batch of defects which possess similar features. Simple methods, such as a nearest neighbor method and a minimum distance method, are sufficient as the method of performing the temporary classification.

By depressing a Decision Tree button 910, a decision tree is constructed automatically by the method to be described later. According to the constructed decision tree, the false alarm judgment of a taught defect is performed. As a result, the false alarm rate which is defined by the ratio of the false alarm to the number of defects determined to be real defects, and the defect capture rate which is defined by the ratio of the number of defects determined to be real defects to the number of defects taught as real defects are displayed. A confirmation screen is displayed, and if confirmed, the decision tree constructed is saved. By depressing an End button 911, the teaching screen 901 is closed. When the decision tree is not constructed yet, a confirmation screen telling the fact is displayed.

Figure 10:
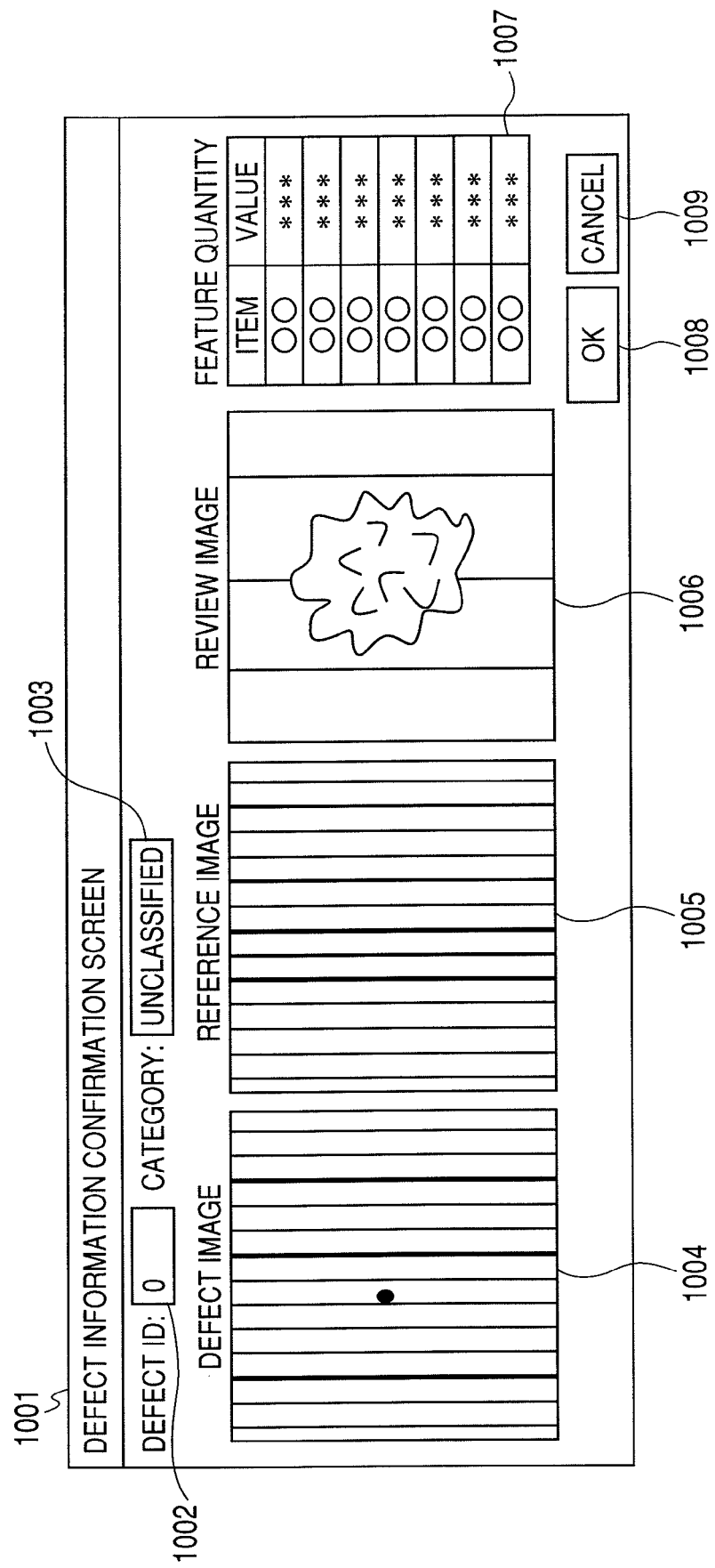
FIG. 10 is an exemplified view illustrating a defect information confirmation screen according to one embodiment of the present invention.

In order to support visual check, double-clicking on a defect image displays defect information. FIG. 10 is an exemplified view illustrating a defect information confirmation screen which displays the detailed information of the defect selected on the teaching screen 901. The defect ID and the pertaining category are displayed respectively by windows 1002 and 1003 on a defect information confirmation screen 1001. A detection image 1004, a reference image 1005, a review image 1006, and a feature list 1007 of the defect are displayed. It is necessary to input the association of the review image and the defect ID beforehand.

A defect of which the detailed information is displayed can be changed by inputting a defect ID into the window 1002. By clicking on the window 1003, a category list is displayed, and selection of a list allows changing the category to the category of "real defect" or to the category of "false alarm." In order to make confirmation easy, in addition, it is more preferable to have functions, such as zooming of an image, a gain change, an offset change, a waveform display, and a dump display. A difference image or its binary image may be displayed together. By depressing an OK button 1008, the defect information confirmation screen 1001 is closed. All the category changes operated on the screen are reflected in the display of the inspection image list display window 904. By depressing a Cancel button 1009, the defect information confirmation screen 1001 is closed. The category change operated on the screen is canceled.

Figure 11:
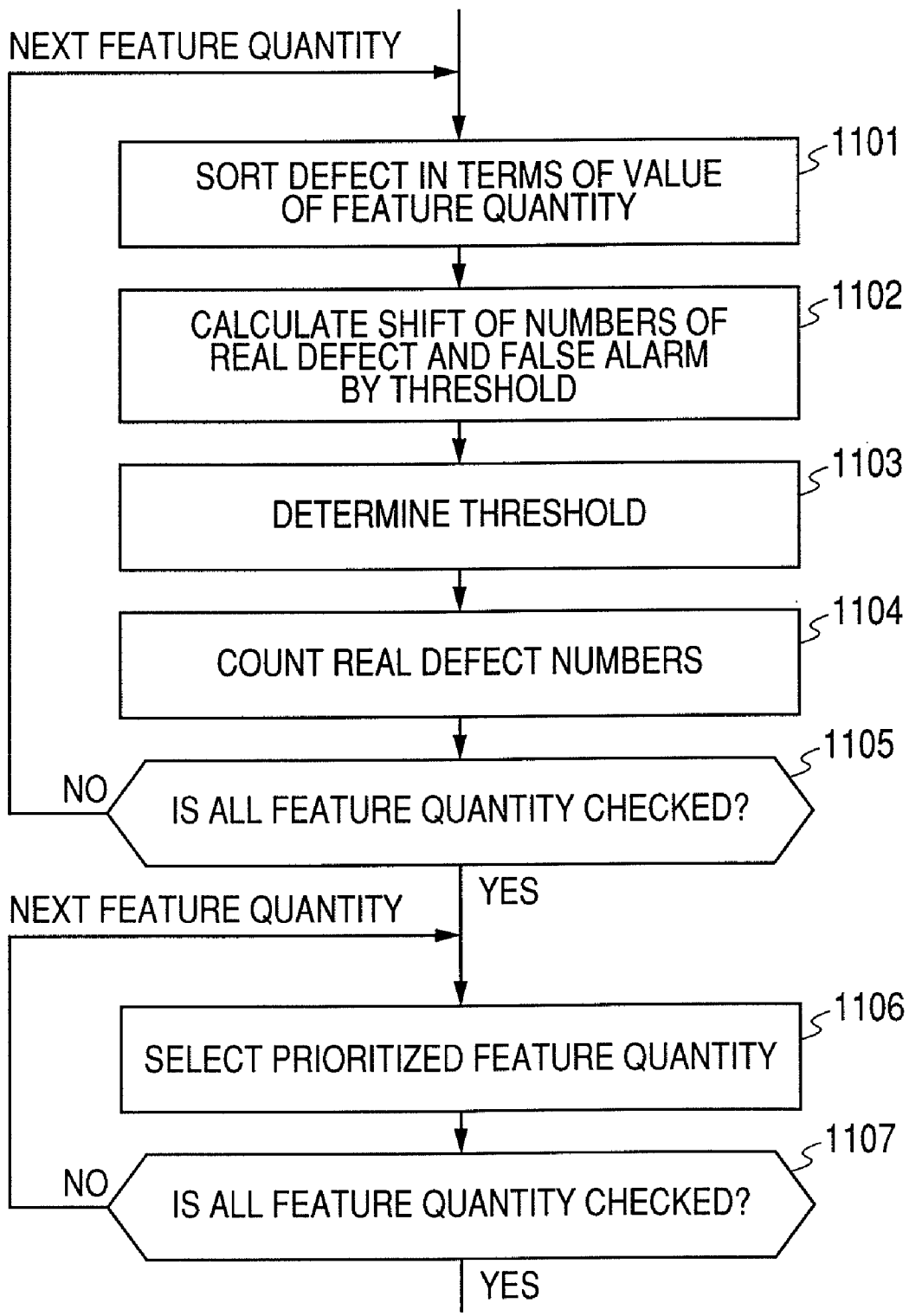
FIG. 11 is a flow chart illustrating a decision tree automatic construction in a first method for setting a false alarm judging condition of the present invention.

The automatic construction of the decision tree which is the next step of the first method for setting false alarm judging conditions is explained. FIG. 11 is a flow chart illustrating automatic construction of a decision tree based on a teaching. First, a defect is sorted for every feature (Step S1101). Next, by changing a threshold, the number of false alarms which are less than the threshold and the number of real defects which are equal to or greater than the threshold are counted and recorded, respectively (Step S1102). The threshold for which the number of false alarms becomes zero is acquired, and the threshold is shifted by the margin (Step S1103). The number of real defects for the threshold is counted (Step S1104). When the processing so far is completed for all the feature quantities (Step S1105), a feature is selected in the order that the corresponding number of real defects is greater and the conditions are fixed from Condition 1 (Step S1106). When all the feature quantities are processed, the decision tree construction will be terminated (Step S1107).

Figure 12:
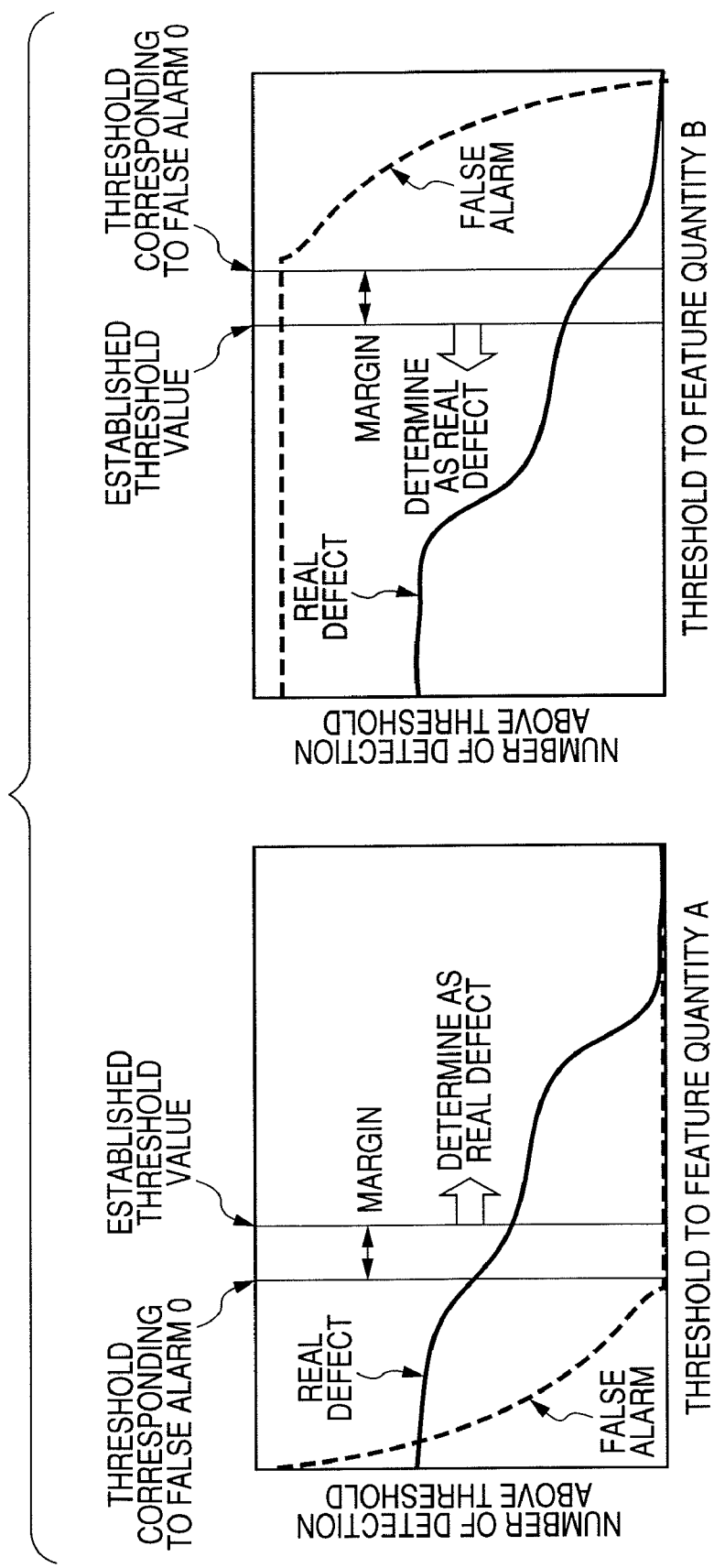
FIGS. 12A and 12B are explanatory charts illustrating a deciding method of a threshold in the first method for setting a false alarm judging condition of the present invention.

FIGS. 12A and 12B are explanatory charts illustrating a threshold setup for a certain feature. FIG. 12 is a graph which shows the shift of the numbers of real defects and false alarms which are equal to or greater than the threshold when the threshold is changed for the certain feature. The solid line indicates the real defect, and the dashed line indicates the false alarm. In the example of the left-hand graph of FIG. 12A, when a threshold is increased, the number of false alarms decreases rapidly. In such a case, the threshold for which the number of false alarms becomes zero is set as a base, and the working threshold is established at the value increased from the base by the margin. From the above process, the condition "if the feature A is equal to or greater than the established threshold value, the detected defect is a real defect" is configured. On the other hand, in the example of the right-hand graph of FIG. 12B, even when a threshold is increased, the number of false alarms does not decrease easily. Conversely, when the number of false alarms which is less than a threshold is counted, the state where the number is zero continues. In such a case, the maximum threshold for which the number of false alarms becomes zero is set as a base, and the working threshold is established at the value decreased from the base by the margin. From the above process, the condition "if the feature B is less than the established threshold value, the detected defect is a real defect" is configured.

Figure 13:
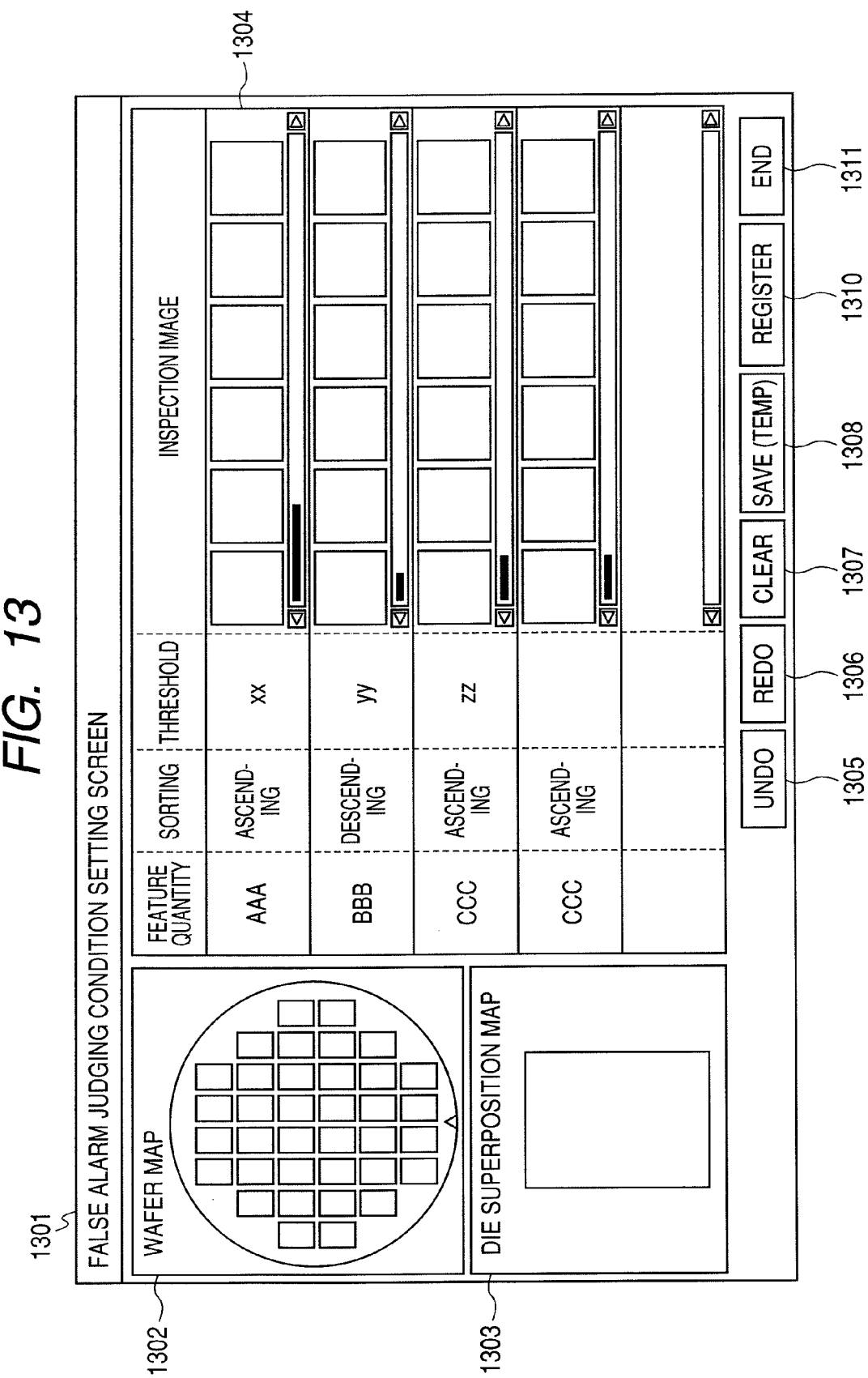
FIG. 13 is an exemplified view illustrating GUI for a false alarm judging condition setup in a visual inspection apparatus according to one embodiment of the present invention.

A second method for setting false alarm judging conditions is explained with reference to FIGS. 13 to 16. In the second method, an inspection image list is displayed and a decision tree is constructed manually, looking at the inspection image list displayed. FIG. 13 is an exemplified view illustrating a false alarm judging condition setting screen which is used in constructing a decision tree manually. A false alarm judging condition setting screen 1301 includes a wafer map viewing window 1302, a die superposition map display window 1303, and an inspection image list display window 1304, like the teaching screen 901 shown in FIG. 9. The wafer map viewing window 1302 and the die superposition map display window 1303 display a map which indicates the defect position in the wafer coordinates and in the die coordinates, respectively. The defect determined to be a real defect and the other defects are displayed with a different color on the map.

Figure 14:
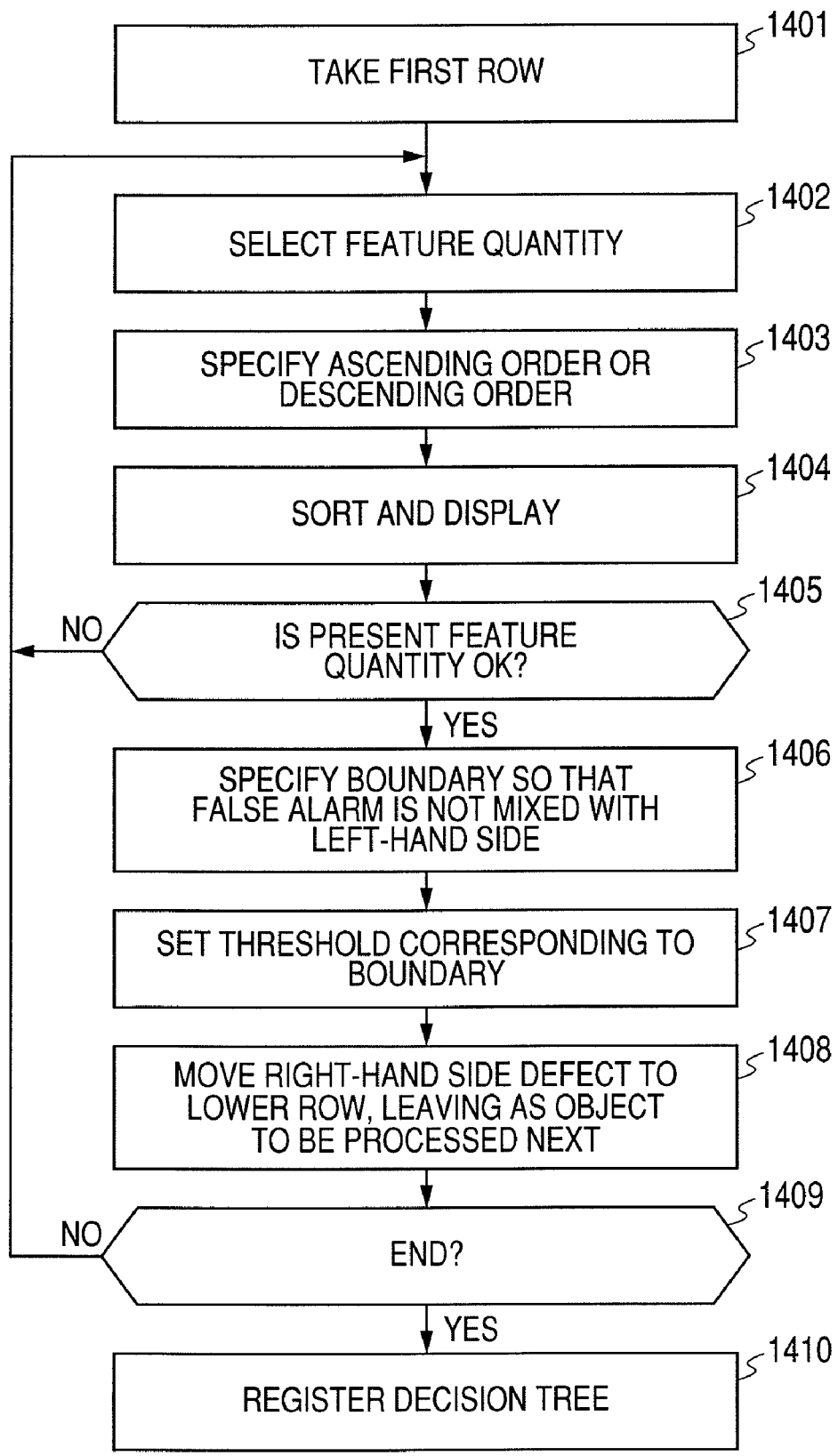
FIG. 14 is a flow chart illustrating a second method for setting a false alarm judging condition of the present invention.

The inspection image list display window 1304 displays an inspection image according to the decision tree under construction. In an initial state, all inspection images are displayed on the highest stage. FIG. 14 illustrates the procedure of constructing a decision tree by operation of the inspection image list display window 1304. First, setting the highest stage as the target (Step S1401), the feature to be employed for conditioning is selected (Step S1402). Next, either of ascending order or descending order is selected (Step S1403). This selection is performed so that real defects may gather in the left-hand side. The present operation is designated such that the operation may be performed only in the target stage. For example, it is preferable that the list is displayed and can be selected by the click on a feature name.

Figure 15:
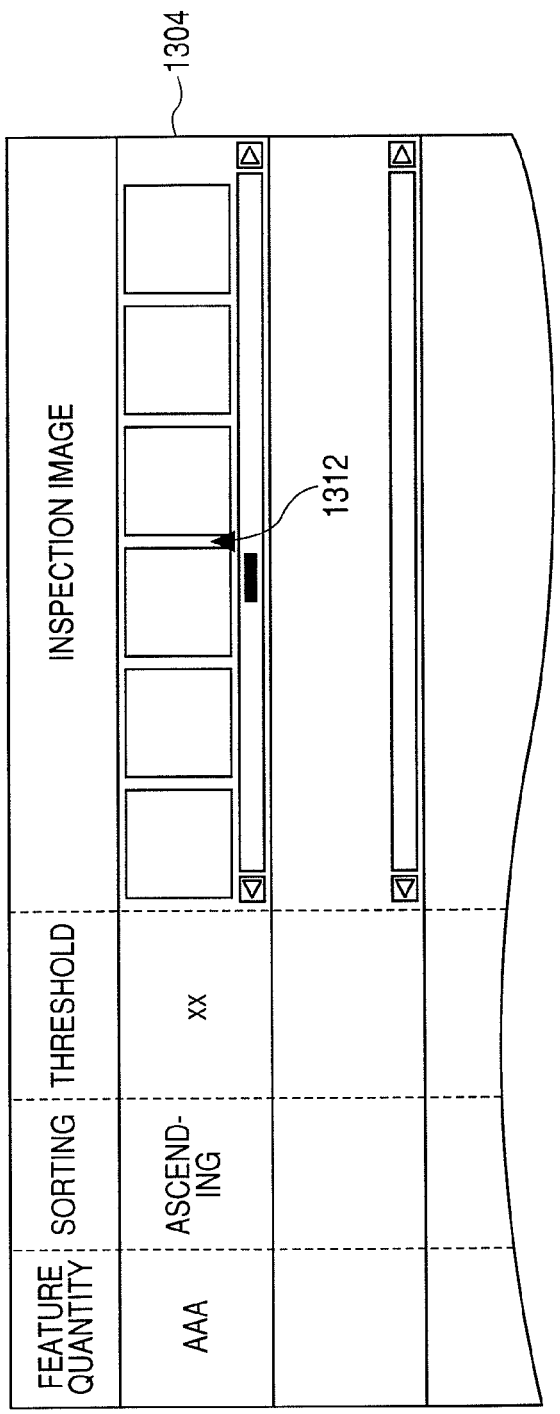
FIG. 15 is an explanatory chart illustrating a setting method of a threshold in the second method for setting a false alarm judging condition of the present invention.

An inspection image is sorted and displayed with the selected feature (Step S1404); therefore, it is determined whether the selected feature is acceptable (Step S1405). When acceptable, a boundary will be next determined (Step S1406). It is desirable to determine the boundary so that a false alarm is not mixed with the left-hand side. As illustrated in FIG. 15, it is preferable that a threshold cursor 1312 is displayed on the target stage, and that the boundary is moved by dragging the threshold cursor 1312 and fixed by double-clicking. However, the cursor is designed not to move to the point where the value of the feature is the same on either side. As a result, the mean value of the feature of the defects on the left side of the boundary and the right side of the boundary is calculated as a threshold and displayed on the threshold column of the target stage (Step S1407).

The defect on the right-hand side of the boundary is moved and displayed on the lower stage, and becomes as an object of the next processing (Step S1408). By the processing so far, one of the conditions which construct the decision tree has been set up. The defect left behind to the upper stage is determined to be a real defect. When terminating construction of the decision tree here (Step S1409), the decision tree constructed will be registered by depressing a Registration button 1309. When continuing, the flow will return to Step S1402. Next, operation by buttons is explained. By depressing an Undo button 1305, the current state returns to the state before the last operation. By depressing a Redo button 1306, the operation canceled by the Undo button 1305 is performed once again.

By depressing a Clear button 1307, the current state returns to the state at which the temporary storing is performed. If never saved temporarily, all the defects move to the highest stage, and the current state returns to the state where the conditions are not decided at all in constructing the decision tree. By depressing a Temporary Store button 1308, the information on association of the condition which constructs the decision tree at the time and the defect ID which fulfills the condition is saved temporarily. By depressing a Registration button 1310, a confirmation screen is displayed, and if confirmed, the decision tree constructed is saved.

Figure 16:
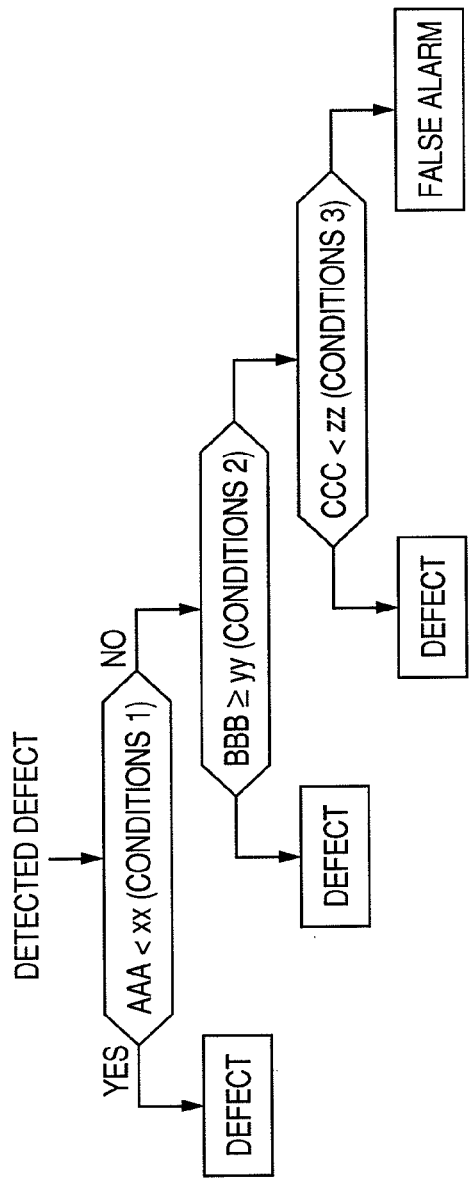
FIG. 16 is an exemplified chart illustrating a constructed decision tree by the first method for setting a false alarm judging condition of the present invention.

FIG. 16 illustrates the decision tree corresponding to the display of the inspection image list display window 1304 of FIG. 13. The present decision tree states that "if the feature AAA is less than xx (Condition 1), the detected defect is determined as a real defect, otherwise, if the feature BBB is equal to or greater than yy (Condition 2), the detected defect is determined as a real defect, otherwise, if the feature CCC is less than zz (Condition 3), the detected defect is determined as a real defect, otherwise, the detected defect is determined as a false alarm." The first to third stages of the inspection image list display window 1304 correspond to Condition 1 to Condition 3 of the decision tree. The direction of the inequality sign in the condition is decided depending on whether sorting is in ascending order or descending order. Since sorting is performed so that a real defect may come to the left-hand side, the direction of the inequality sign is "<" for the ascending order and is "≧" for the descending order. The final stage corresponds to what does not fulfill Condition 3, and is determined as a false alarm.

By depressing an End button 1311, the false alarm judging condition setting screen 1301 is closed. When the conditions which construct a decision tree are not decided at all, a confirmation screen telling the fact is displayed. The defect information confirmation screen for supporting a visual check functions similarly as in the case of the first method.

In the above explanation, the construction of the decision tree is limited so that the decision tree always determines the left-hand side which fulfills each condition to be a real defect, and the next condition hangs down only from the right-hand side. Consequently, the decision tree can be constructed by setting the conditions that only a real defect remains in the left-hand side, and performing, stage by stage, the operation which moves objects in the right-hand side to the lower stage. According to the present method, what is necessary is just to repeat the simple condition setting operation by the simple decision criterion. Therefore, the decision tree is easily realizable in the viewpoint of user's operation as well as the viewpoint of GUI design.

Although the operation will be more complicated than the present case, it is also possible not to limit the structure of the decision tree. In that case, the first step is the same as the above-mentioned method, and what is different is that an arbitrary stage is selectable as an object of operation of the second step or later. After setting conditions, the defect on the right-hand side of the boundary will move below the last stage. Since conditions which a defect of each stage has passed through become unclear, it is necessary to leave a record of the conditions (i.e., the feature, the direction of inequality sign, and the threshold). Since the limitation that the left-hand side is a real defect is lifted, a user is advised to specify a false alarm or a real defect. An effective false alarm judgment will become possible, not only by sorting in terms of feature, but by configuring structure which can separate a real defect from a false alarm by setting a real defect on the left side of the decision tree and setting a false alarm on the right side of the decision tree on the inside and outside of an area specified on the map. In addition, if the false alarm judging condition setter 115 is equipped also with the function to input directly and to edit the information on a decision tree, handling of an inspection image will be preferably omitted.

The structure in which an optical review station is added to the structure of the visual inspection apparatus illustrated in FIG. 1 is also expected. The review station picturizes the image of high magnification by the review optical system, by moving the stage so that the image of the specified defect position can be detected after the inspection. It is preferable to create the structure in which the image of the selected defect can be picturized and displayed by operation from the above-mentioned defect information confirmation screen 1001. In this way, when the structure in which the inspection apparatus is provided with the review station is adopted, it will become unnecessary to picturize an image by an SEM review apparatus, leading to shortening of the total defect verifying time.

The visual inspection method and apparatus of the present invention are not limited to the visual inspection apparatus in the present embodiment. For example, when the detection system 13 adopts a dark field detection system or a SEM detection system, a regional sensitivity setup is possible in the same structure.

Figure 17:
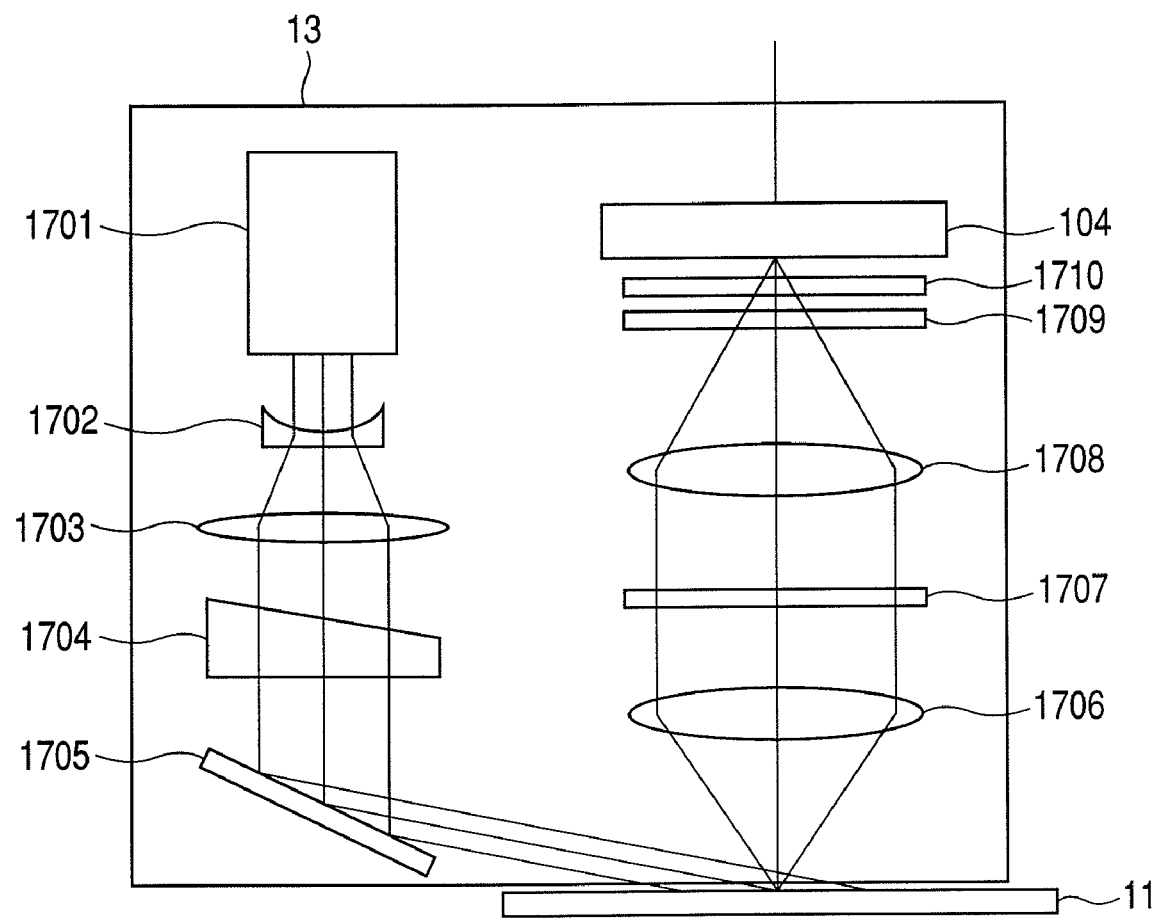
FIG. 17 is a diagram illustrating a detector of a visual inspection apparatus according to another embodiment of the present invention.

The visual inspection method and the apparatus according to the second mode of the present invention are explained with reference to FIG. 17. FIG. 17 shows an example of the structure of the detection system 13 when a dark field optical system is adopted. In the detection system 13, light is illuminated to an object obliquely and the scattered light from the object is detected in the upper part. The light projected from a laser source 1701 illuminates a wafer 11 obliquely, after being formed in a slit shape with the aid of a beam expander optical system including a concave lens 1702 and a convex lens 1703, a conical surface lens 1704, and a mirror 1705. The illuminating light is formed in a slit shape aiming at a high speed inspection.

The detecting optical system which detects the scattered light on the surface of the wafer 11 includes a Fourier transform lens 1706, a spatial filter 1707, an inverse Fourier transform lens 1708, an ND filter 1709, an optical filter 1710 such as a polarization plate, and an image sensor 104. The spatial filter 1707 is put on a Fourier transform plane, and shades the diffracted light from the repeated pattern on the wafer. On the other hand, most part of the scattered light from a defect is not shaded and received by the image sensor 104, since the scattered light spreads irregularly on the Fourier transform plane. Consequently, S/N is enhanced and a high-sensitive detection of a defect becomes possible. The signal detected with the image sensor 104 serves as an input of the image processor 14. The defect detection, the false alarm judgment, and the defect classification are preformed by the same method as that of the first embodiment of the present invention.

Embodiment 2

Figure 18:
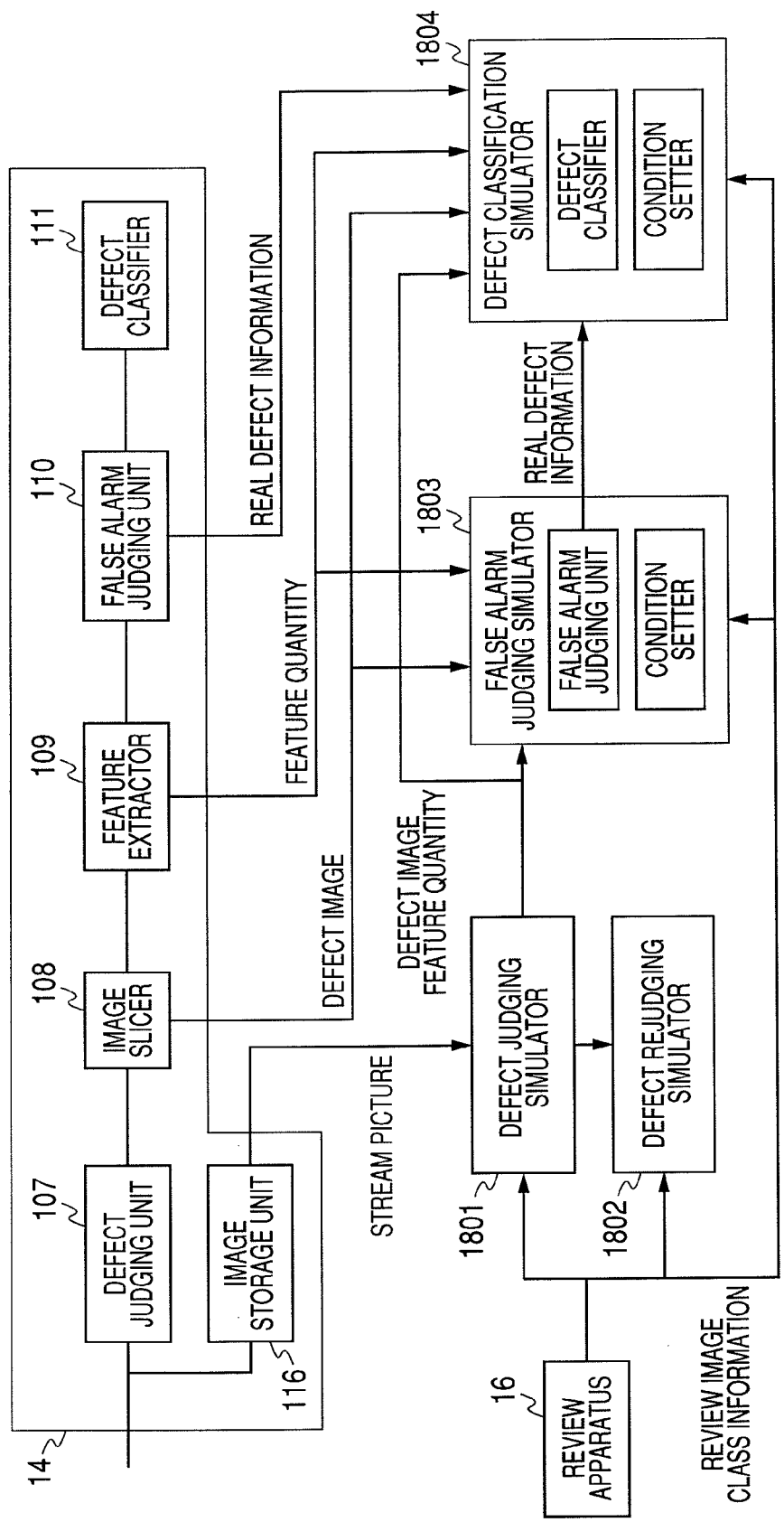
FIG. 18 is a diagram illustrating structure of an image analysis system according to a first embodiment of the present invention.

In Embodiment 1, the false alarm judging condition setter 115 is included in the inspection apparatus; however, the false alarm judging condition setter 115 may be separated from the inspection apparatus, and may be included in an off-line image analysis system. The following explains an image analysis system according to a second embodiment of the present invention with reference to FIGS. 18 and 19. FIG. 18 shows an example of structure of the image analysis system according to the second embodiment of the present invention. The image analysis system provides simplification of the defect judgment, the false alarm judgment, and the conditioning of the defect classification which are processed in the image processor 14 of the inspection apparatus.

As illustrated in FIG. 18, the image analysis system includes a defect judging simulator 1801, a defect re-judging simulator 1802, a false alarm judging simulator 1803, and a defect classification simulator 1804. When using the image analysis system according to the second embodiment of the present invention, it is desirable to employ a review apparatus 16 for the check of a defect and to acquire review information such as a review image. When the defect judging simulator 1801 is employed, it may be necessary to save a stream picture in an image storage unit 116 of the inspection apparatus.

Figure 19:
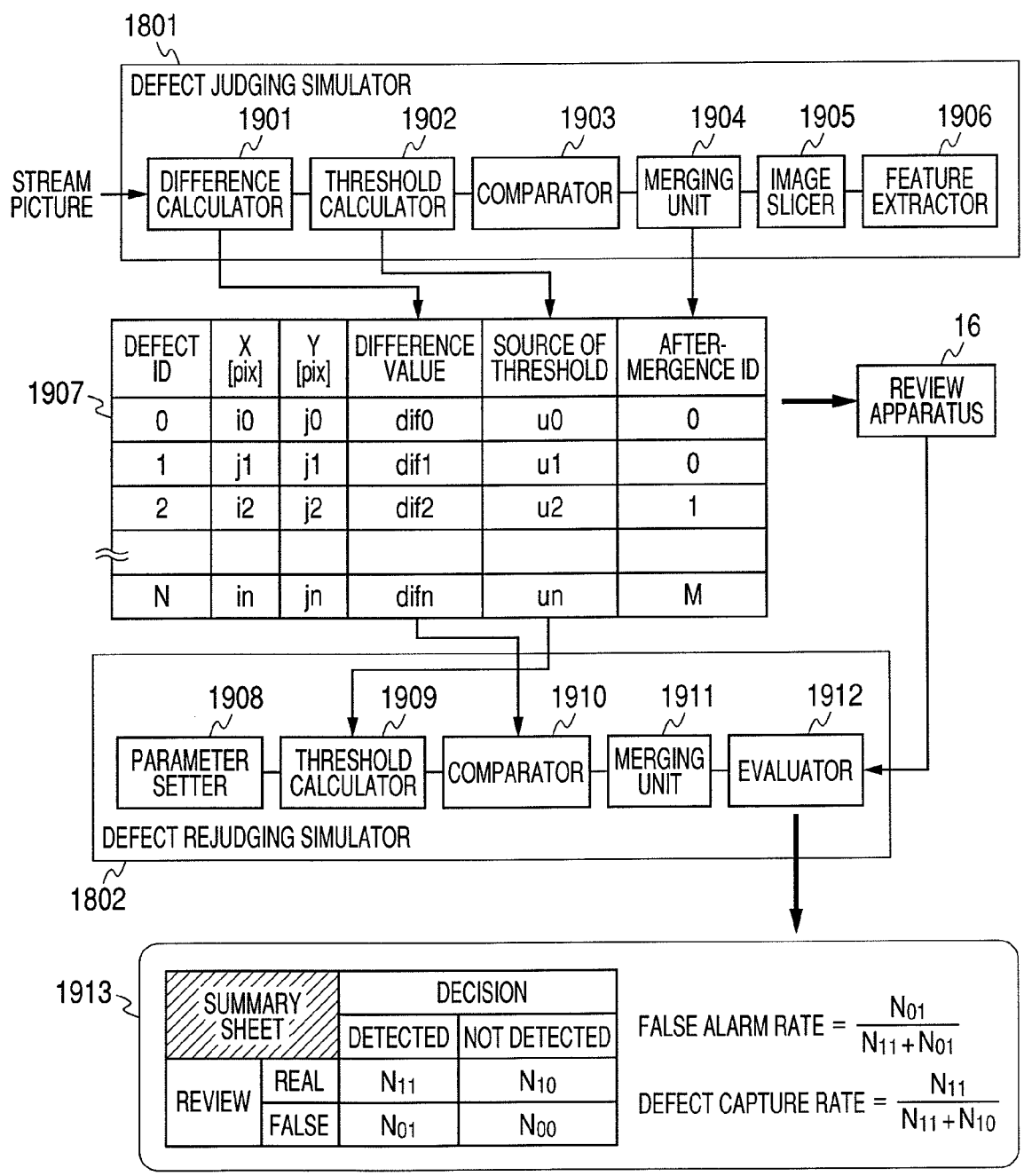
FIG. 19 is an explanatory diagram illustrating a defect judging simulator and a defect re-judging simulator according to one embodiment of the present invention.

The defect judging simulator 1801 first inputs a stream picture which is outputted from the image storage unit 116. The defect judging simulator 1801 performs the same processing as the defect judging unit 107 of the inspection apparatus, but provides a different output. FIG. 19 illustrates the detailed structure of the defect judging simulator 1801 and the defect re-judging simulator 1802. A difference calculator 1901 clips images according to the size of a die from the stream picture, defines the images of the adjoining dies as a detection image and a teaching image, and calculates a difference image after making registration of the detection image and the teaching image.

Next, a threshold calculator 1902 calculates a threshold using difference images covering plural dies. At this time, the parameter which becomes the source of the threshold is recorded. In the example illustrated in FIG. 3, the parameter is a standard deviation σ of the difference value of pixels at the same coordinates covering plural dies. Next, a comparator 1903 compares the difference value with the threshold for every pixel, and determines the pixel which possesses a difference value greater than the threshold to be a defect. The coordinates of the pixel determined to be a defect are recorded on pixel-wise defect information 1907 together with the difference value and the parameter which serves as the source of the threshold.

Next, a merging unit 1904 merges the range which is considered as one defect, and attaches an after-merge defect ID to each pixel-wise defect. Labeling, integration for every fixed block, integration by a distance threshold, etc. can be expected as the method of merging. The pixel-wise defect information 1907 recorded by the above process serves as an input of the defect re-judging simulator 1802. An image slicer 1905 clips a detection image and a reference image in the predetermined size centering on the position of the defect after merge. A feature extractor 1906 calculates an image feature based on the detection image and reference image which have been clipped, and a coordinate feature based on the position information on the defect.

The defect judging simulator 1801 also possesses defect verifying means (not show). A real defect or a false alarm is taught by operation of drag and drop using GUI as shown in FIGS. 9 and 10. A review image is not necessarily required at this time. However, for confirmation, it is necessary to acquire a review image by one of the following methods.

A first method converts the coordinates of the detected defect into a wafer coordinates after the completion of the simulation, and reviews each defect by a review apparatus 16. A second method reviews the detected defect included in the saved stream picture after the completion of the inspection by the inspection apparatus, converts the wafer coordinates of the defect into the coordinates on the stream picture, and performs comparison with the detected defect by the simulator.

The first method has the advantage that the review information of all the defects is obtained, but has the disadvantage that it takes a longer time since the wafer is secured during the simulation and the review is performed after the completion of the simulation. The second method has the advantage that the simulation and the review can be performed in parallel and hence time can be saved, but has the disadvantage that the defect detected by the inspection apparatus and the defect detected by the simulator are not necessarily in agreement. The wafer coordinates of the origin of the stream picture, the pixel size, and the die size are necessary as information for a coordinate link.

When a real defect or a false alarm is determined by the above, the evaluation of the number of a detected real defect and the false alarm rate will be possible. Setup of optimum conditions is possible by performing the simulation with changing parameters, and repeating the evaluation. The defect re-judging simulator 1802 provides a method of performing conditioning for a shorter time than the defect judging simulator 1801.

First, parameters are set by a parameter setter 1908. In the example illustrated in FIG. 3, the parameters are s, k, and o. With the pixel-wise defect information 1907 as an input, a threshold is recalculated in a threshold calculator 1909 using the parameters which serve as the source of the threshold. A comparator 1910 compares the inputted difference value with the calculated threshold, and performs defect judgment. A merging unit 1911 collects the defect pixels which should be merged based on the after-merge defect ID. When even one pixel is determined to be a defect, the defect is regarded to be detected.

Based on the above-taught information on the real defect or the false alarm, an evaluator 1912 counts the number of detection/non-detection of the real defect, the number of detection/non-detection of the false alarm, calculates a false alarm rate and a defect capture rate, and displays and records an evaluation result 1913. According to the present technique, it becomes possible to find optimum conditions for a short time, since image processing is not performed.

The false alarm judging simulator 1803 performs the false alarm judgment and conditioning which have been explained in Embodiment 1. The false alarm judging simulator 1803 can input and process the defect image and the feature which are outputted from any one of the inspection apparatus and the defect judging simulator 1801. A false alarm judging unit inputs set-up conditions and outputs real defect information after performing a false alarm judgment. Consequently, it is possible to use the false alarm judging unit as an off-line false alarm determining device. A condition setter is the same as the false alarm judging condition setter 115 of Embodiment 1. The constructed decision tree can be used as the input of the inspection apparatus.

The defect classification simulator 1804 can be used as an off-line apparatus for defect classification or an off-line apparatus for setting defect classification conditions. The defect classification simulator 1804 inputs the feature and the real defect information outputted by the false alarm judging unit. The feature and the real defect information may employ any one among the output from the inspection apparatus, the output from the defect judging simulator 1801, and the output from the false alarm judging simulator 1803. A defect classifier is the same as the defect classifier 111 of Embodiment 1. The defect classifier inputs the established defect classification conditions and outputs defect class information. As a classifier, any kind of classifier may be used as long as it is a teaching classification algorithm; a k-nearest neighbor algorithm, a subspace method, a fuzzy porting method, a flexible naïve Bayes classifier, a support vector machine method, and other various methods can be expected. It is effective to have all and to make them selectable. Alternatively, a decision tree may be sufficient as a classifier.

A condition setter performs a teaching by a teaching screen similar to GUI illustrated in FIG. 9, or reads the class information of a review result from a file, and performs association of the feature and the defect class. However, in FIG. 9, the category column possesses "defect class name" and "unclassified" only. As feature amount data, the output of the feature extractor 109 or the feature extractor 1906 may be employed as it is. However, it is more preferable if the feature amount data is standardized by the formula of $x=(x-\mu)/\sigma$ for every feature. Here, x is a value of the feature, $\mu$ is an average, and $\sigma$ is a standard deviation.

When the feature is non-negative, it is advised to convert the scale of feature by using a real number $\lambda$ which is one or less and not zero, and making $\lambda$-th power of the value of the feature before the standardization. As the result, an answer rate is expected to improve. Or it may be effective to employ the feature for which the axis transformation is carried out using the principal component analysis etc. It may also be effective to employ feature to which new feature is added after performing a certain operation, such as calculating the ratio among items of the feature.

Next, estimation is performed by a leave-one-out method, changing selection algorithm and a parameter. The leave-one-out method repeats, by the sample number, evaluation of the samples with one sample as a test sample and the remainder as learning samples. A confusion matrix is displayed at the time of evaluation. Means to visualize distribution of the feature is also provided, such as a histogram, a scatter diagram of the selected feature, a principal component analysis result, a linear discriminant analysis result, etc. Based on these pieces of information, the classification algorithm is selected and the parameter is set. It is possible to learn and to create a classification condition using the selected algorithm and parameter.

When a decision tree is used as the classifier, construction of the decision tree is possible by operation of the same condition setting screen as GUI illustrated in FIG. 13. It is assumed that the method does not limit the structure of the decision tree, and that the label of a defect class is finally attached to each stage in the method. The classification condition created here can be inputted to the inspection apparatus.

According to the above-mentioned image analysis system, it is possible to perform off-line evaluation of the defect judgment, false alarm judgment, and defect classification of the inspection apparatus. Consequently, it is possible to set up optimum conditions without occupying the apparatus, and the inspection result in optimum conditions can be obtained at the same time.

Embodiment 3

Figure 20:
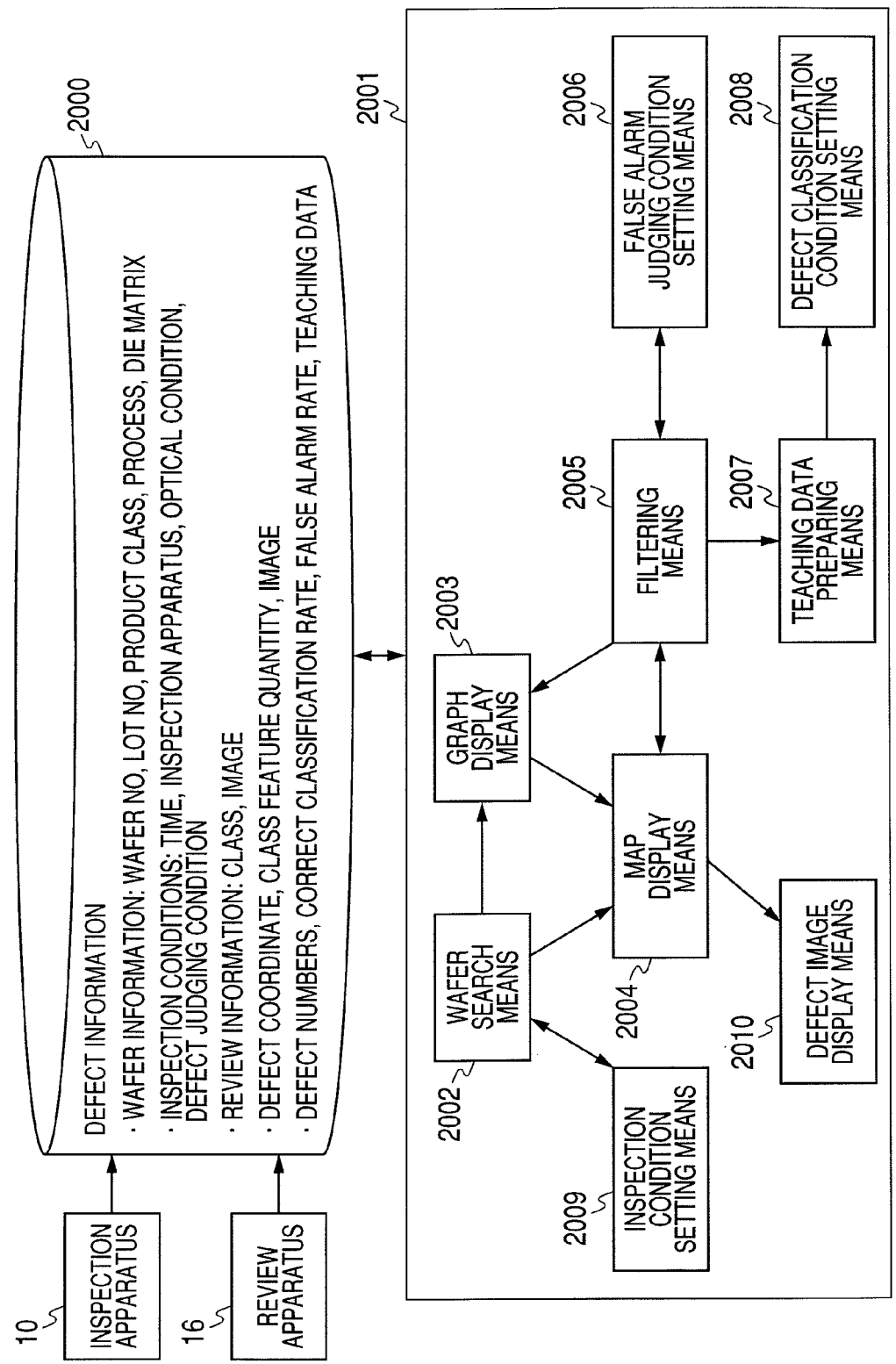
FIG. 20 is a diagram illustrating structure of an image analysis system according to a second embodiment of the present invention.

Embodiment 2 enables the conditioning of the defect judgment, false alarm judgment, and defect classification of the inspection apparatus using the information on one wafer as mentioned above. In contrast, the present embodiment performs such conditioning using the information on plural wafers. The following explains about an image analysis system according to a third embodiment of the present invention, with reference to FIG. 20. FIG. 20 is an exemplified diagram illustrating structure of the image analysis system according to the third embodiment of the present invention.

An inspection apparatus 10 inspects a wafer and outputs an inspection result. The inspection result includes information on coordinates of a detected defect, a feature, a defect class by the inspection apparatus, an inspection image, etc., with additional information to specify a wafer, such as a wafer number, a lot number, a product class, and process, and other additional information to specify inspection condition, such as time, optical conditions, and defect judging conditions. The inspection result is stored in a defect information database 2000. A review apparatus 16 reviews about a specified defect of a specified wafer, and appends review information, such as a defect class by the review apparatus, and a review image, to the corresponding defect information in the database 2000.

Wafer search means 2002 performs filtering using a specification item. As an item to employ, a product class, a process, an inspection condition, and the existence of review information, etc. can be expected. Sorting is performed, for example using a specification item such as time and defect numbers, and a wafer list is created. Graph display means 2003 displays a graph illustrating the shift of defect numbers according to the wafer list. It is also possible to display plural graphs in multiple layers by a group of a product class, an inspection apparatus, etc. by specifying items.

Map display means 2004 displays a map indicating a defect position of the wafer which is selected from the wafer list. It is possible to select multiple maps. In that case, maps are displayed as arranged side by side. It is also possible to display an arbitrary number of maps in multiple layers. It is also possible to switch the display of a wafer map expressed in the wafer coordinates and the display of a die superposition map expressed in the die coordinates. An enlarged display is also possible. A click on a certain position on a map will display a defect information confirmation screen as illustrated in FIG. 10. When there is no image, it is displayed accordingly. Selection of a wafer is possible also from the graph illustrating the shift of defect numbers.

Defect image display means 2010 displays the teaching screen which is same as GUI illustrated in FIG. 9, about a wafer selected in the map display means 2004. The category column is assumed to possess "defect class name", "false alarm", and "unclassified." An inspection image is displayed according to the defect class provided by the review apparatus. When there is no review information, the corresponding inspection image is classified as "unclassified." The teaching is possible with drag and drop. As in Embodiment 1, the defect information confirmation screen illustrated in FIG. 10 is displayed about the selected defect, and the category is selectable on the screen. The defect class determined here is recorded on the database 2000.

Filtering means 2005 filters a defect using a specified condition. For example, a specified defect class can be left or removed. A defect can be left or removed by threshold processing with respect to the specified feature. It is also possible to support multi-stage threshold processing, such as a decision tree. Specifying an area on a superposition map, a defect in the specified region can also be left or removed. The result of filtering is reflected in the map display, and the removed defect number is counted and displayed near the map with the total defect number. A defect list of the defect matched with the conditions is created.

A decision tree is constructed by a manual input in false alarm judging condition setting means 2006. It is also effective to enable description called the inside or the outside of a specified region in the conditions which construct the decision tree. The area specification is performed in the map display means 2004. The constructed decision tree is sent to the filtering means 2005, and the filtering is performed according to the decision tree. When the false alarm is taught in the defect image display means 2010, a defect capture rate and a false alarm rate are also calculated with the total defect number and the removed defect number, and a graph showing the shift of the defect capture rate and the false alarm rate is displayed also in the graph display means 2003. A suitable false alarm judging condition can be determined by editing the decision tree, looking at the map list and the graph in which change occurs.

Teaching data preparing means 2007 first performs filtering in terms of the existence of the review information, and creates a defect list. A defect of which the defect class is taught in the defect image display means 2010 may be included in the defect list. Feature quantity data with class information is created by using the defect list as it is or after sampling, and sent to defect classification condition setting means 2008. The sampling may be performed at random for the determined overall number. Alternatively the sampling may be performed at random for the defect number determined for every class. The sampling may be performed based on a feature distribution which is disclosed by JP-A-2006-266872. As in Embodiment 2, the defect classification condition setting means 2008 selects an optimal classification algorithm and sets the parameter, by changing a candidate classification algorithm and the parameter, and estimating by the leave-one-out method. The classification condition is set up using all teacher data.

Inspection condition setting means 2009 selects a process first and then a product class, and creates a wafer list. The product class is arranged so that plural specifications may be possible. The optical condition of the inspection apparatus or the item of an image processing parameter is specified, and for every group whose specification item agrees, maps are displayed side by side and the shift graphs of detected defect numbers are displayed. It is effective to perform sorting by defect numbers for every group, in advance. Looking at change of the map and graph along with the specification item, a better condition is chosen with respect to the item with a significant difference. The existence of a significant difference may be calculated statistically and may be displayed.

According to the embodiments of the present invention, by performing a false alarm judgment according to the decision tree constructed by threshold processing with respect to either one of the image feature and the coordinate feature, discernment of a real defect and a false alarm can be performed with a sufficient precision, and a high-sensitive inspection can be performed, suppressing the occurrence of a false alarm.

Based on teaching that the detected defect is a real defect or a false alarm, the decision tree can be easily constructed by automatically selecting the feature based on the histogram for every feature, and deciding the threshold.

By displaying an image in the ascending order or descending order of the feature selected by the user, the threshold can be decided easily and a suitable decision tree can be constructed by repeating the processing recursively.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A visual inspection method detecting a defect with the use of a detected signal obtained by illuminating one of a light and an electron beam onto a substrate to be inspected, the visual inspection method comprising the steps of:
   calculating an image feature based on an image of the detected defect;
   calculating a coordinate feature based on position information of the detected defect; and
   outputting real defect information by performing false alarm judgment according to a decision tree configured by threshold processing with respect to one of the image feature and the coordinate feature.

2. The visual inspection method of claim 1, wherein the deciding the decision tree includes the steps of:
   performing teaching of whether the detected defect is a real defect or a false alarm; and
   calculating an image feature based on an image of the detected defect, calculating a coordinate feature based on position coordinates of the detected defect, calculating a histogram of a real defect and a false alarm for every feature, choosing automatically one of the image feature and the coordinate feature based on the histogram, and deciding a threshold value.

3. The visual inspection method of claim 1, wherein the deciding the decision tree includes the steps of:
   calculating the image feature based on an image of the detected defect;
   calculating the coordinate feature based on the position coordinates of the detected defect;
   choosing one of the image feature and the coordinate feature;
   displaying an image of the detected defect in one of ascending order and descending order of the chosen feature;

setting a boundary to separate one region from another, so that the one region may include no false alarm; and wherein, as for another defect, the step of choosing the feature and the subsequent steps thereof are recursively repeated.

4. A visual inspection apparatus comprising:

a stage operable to hold a substrate to be inspected;

image detection means operable to detect an image of the substrate to be inspected by illuminating one of a light and an electron beam onto the substrate to be inspected;

defect detecting means operable to detect a defect by image processing of the detected image;

image feature calculating means operable to calculate an image feature based on an image of the detected defect;

coordinate feature calculating means operable to calculate a coordinate feature based on position information of the detected defect; and false alarm judging means operable to output real defect information by performing false alarm judgment according to a decision tree configured by threshold processing with respect to one of the image feature and the coordinate feature.

5. The visual inspection apparatus of claim 4 further comprising:

display means operable to be used for judging whether the detected defect is a real defect or a false alarm; and false alarm judging condition setting means operable to configure the decision tree by calculating a histogram of a real defect and a false alarm for every feature, choosing automatically one of the image feature and the coordinate feature based on the histogram, and deciding a threshold value.

6. The visual inspection apparatus of claim 4 further comprising:

display means operable to choose one of the image feature and the coordinate feature, to display an image of the detected defect in one of ascending order and descending order of the chosen feature, and to set a boundary separating one region from another, so that the one region may include no false alarm; and false alarm judging condition setting means operable to configure the decision tree by recursively repeating the processing of choosing the feature and the subsequent processing thereof, as for another defect.

7. An image analysis system comprising:

a defect judging simulator operable to input a stream picture fed by an inspection apparatus, to perform defect judgment with the aid of image processing, to slice an inspection image of a defect position, to extract a feature based on the inspection image and position information, and to output coordinates of a detected defect, the inspection image, and the feature;

a false alarm judging simulator including means operable to input the inspection image and the feature, to perform teaching of whether the defect is a real defect or a false alarm based on the inspection image, and to set a false alarm judging condition based on the teaching data and the feature, and means operable to perform false alarm judgment according to the false alarm judging condition with reference to the feature, and to output information on a defect determined to be a real defect and the false alarm judging condition; and a defect classification simulator operable to input the inspection image and the feature, to teach a defect class based on the inspection image, to set a defect classification condition based on the teaching data and the feature, to perform defect classification according to the defect classification condition with reference to the feature, and to output the defect class information and the defect classification condition.

8. The image analysis system of claim 7, wherein the defect judging simulator is operable to make registration of an inspection image and a reference image to calculate a difference value of the inspection image and the reference image, to calculate a threshold value based on the difference value, to perform defect judgment comparing the difference value with the threshold value, to merge defects which should be regarded as one defect, and to output coordinates of a pixel-wise defect, the difference value, a parameter as a base of the threshold calculation, and pixel-wise defect information including an after-merge defect ID, and wherein the image analysis system further includes a defect re-judging simulator operable to recalculate the threshold value based on the pixel-wise defect information and a separately-inputted parameter, to perform defect judgment in comparison with the difference value, to merge the judgment result based on the after-merge defect ID, and to evaluate a real defective capture rate and a false alarm rate based on review information separately inputted.

9. The image analysis system of claim 7, wherein the defect judging simulator is operable to align an inspection image and a reference image to calculate a difference value of the inspection image and the reference image, to calculate a threshold value based on the difference value, to perform defect judgment comparing the difference value and the threshold value, to merge defects which should be regarded as one defect, and to output coordinates of a pixel-wise defect, the difference value, a parameter as a base of the threshold calculation, and pixel-wise defect information including an after-merge defect ID, and wherein the image analysis system further includes a defect re-judging simulator operable to recalculate the threshold value based on the pixel-wise defect information and a separately-inputted parameter, to perform defect judgment in comparison with the difference value, to merge the judgment result based on the after-merge defect ID, and to evaluate a real defective capture rate and a false alarm rate based on review information separately inputted.

* * * * *